(12) United States Patent
Niwa

(10) Patent No.: US 7,511,477 B2
(45) Date of Patent: Mar. 31, 2009

(54) DISPLACEMENT DETECTOR

(75) Inventor: Masahisa Niwa, Suita (JP)

(73) Assignee: Matsushita Electric Works, Ltd., Osaka (JP)

( * ) Notice: Subject to any disclaimer, the term of this patent is extended or adjusted under 35 U.S.C. 154(b) by 406 days.

(21) Appl. No.: 10/519,797

(22) PCT Filed: Apr. 22, 2004

(86) PCT No.: PCT/JP2004/005830

§ 371 (c)(1),
(2), (4) Date: Jul. 13, 2005

(87) PCT Pub. No.: WO2004/099727

PCT Pub. Date: Nov. 18, 2004

(65) Prior Publication Data

US 2006/0164075 A1    Jul. 27, 2006

(30) Foreign Application Priority Data

Apr. 22, 2003    (JP) ............................. 2003-117600

(51) Int. Cl.
*H01F 5/00* (2006.01)
*G01B 7/14* (2006.01)
*G01B 7/30* (2006.01)

(52) U.S. Cl. ............................ 324/207.16; 324/207.24; 324/207.25

(58) Field of Classification Search ............ 324/207.11, 324/207.12, 207.15, 207.16, 207.17, 207.24, 324/207.25, 202
See application file for complete search history.

(56) References Cited

U.S. PATENT DOCUMENTS

| 4,864,232 A | 9/1989 | Redlich |
| 5,003,258 A | 3/1991 | Mancini |

(Continued)

FOREIGN PATENT DOCUMENTS

JP    02-038903 A1    2/1990

(Continued)

OTHER PUBLICATIONS

International Search Report for PCT/JP2004/005830 mailed on Sep. 21, 2004.

*Primary Examiner*—Kenneth J Whittington
(74) *Attorney, Agent, or Firm*—Cheng Law Group PLLC

(57) ABSTRACT

The present invention is directed to a displacement detector which can compensate a change in temperature coefficient of impedance of a coil to a displacement of a core. The detector comprises a constant-current supply unit for outputting a constant current including an alternating current, a coil portion, to which the constant current is supplied, a magnetic core supported to be movable relative to the coil portion in a movable range, and a signal processing circuit for determining a displacement of the core to the coil portion according to a change in output voltage of the coil portion under the supply of the constant current to the coil portion, characteristic-value extracting unit for extracting a characteristic value (V1) from the output voltage of the coil portion, and a level shift circuit for adding a level shift voltage (Vsh) to the characteristic value. A fluctuation width of temperature coefficient of a total (V2) of the characteristic value (V1) and the level shift voltage (Vsh) in the movable range is smaller than the fluctuation width of temperature coefficient of the characteristic value (V1) in the movable range.

9 Claims, 18 Drawing Sheets

U.S. PATENT DOCUMENTS

| | | | |
|---|---|---|---|
| 5,043,661 A | 8/1991 | Dubey | |
| 5,107,211 A | 4/1992 | Rose | |
| 5,115,193 A * | 5/1992 | Bean et al. | 324/207.12 |
| 5,898,300 A | 4/1999 | Heizmann et al. | |
| 6,781,366 B2 * | 8/2004 | Hiramatsu et al. | 324/207.18 |
| 7,061,229 B2 * | 6/2006 | Townsend et al. | 324/207.12 |
| 2003/0173952 A1 | 9/2003 | Niwa | |

FOREIGN PATENT DOCUMENTS

| | | |
|---|---|---|
| JP | 04-306890 A1 | 10/1992 |
| JP | 08-271204 A1 | 10/1996 |
| JP | 09-033202 A1 | 2/1997 |
| JP | 2000-186903 A1 | 7/2000 |
| JP | 2003-083764 A1 | 3/2003 |
| WO | WO03/002947 * | 1/2003 |

* cited by examiner

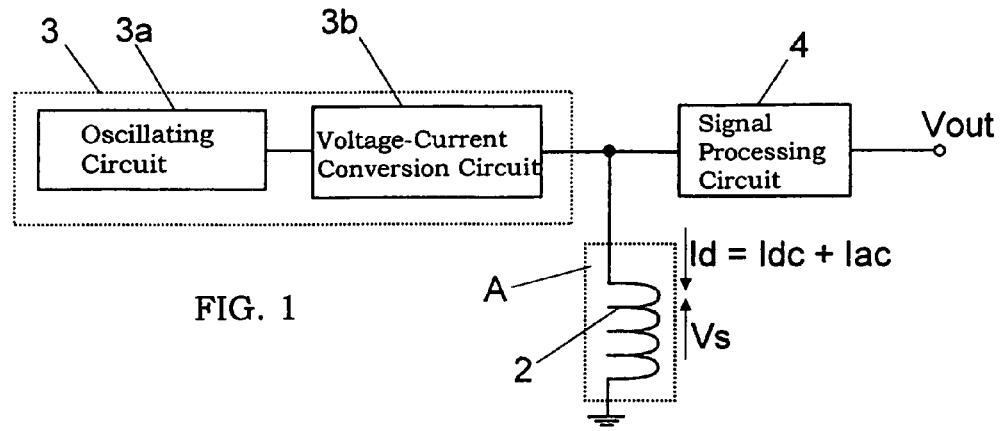
FIG. 1
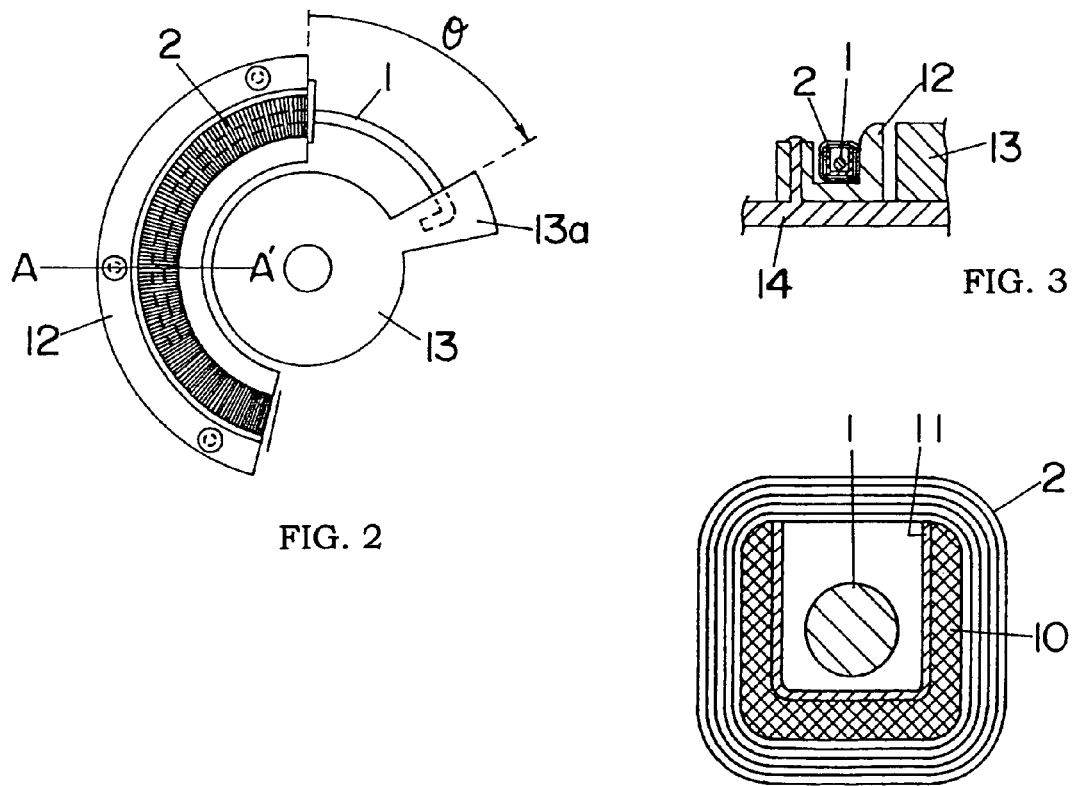
FIG. 2
FIG. 3
FIG. 4
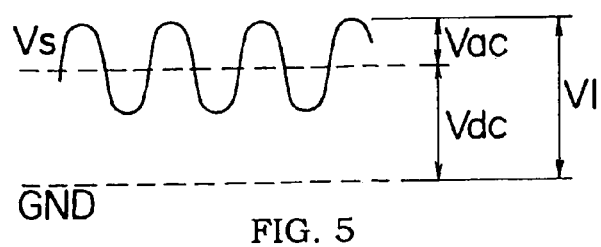
FIG. 5

| Materials | Resistivity ($\mu \Omega \cdot m$) |
|---|---|
| Soft Magnetic Iron (SUY-0) | 0.1 |
| Permalloy(PC) | 0.6 |
| Electromagnetic stainless steel | 0.6 |
| SUS430 | 0.6 |
| Iron Chrome (FCH2) | 1.2 |
FIG. 28
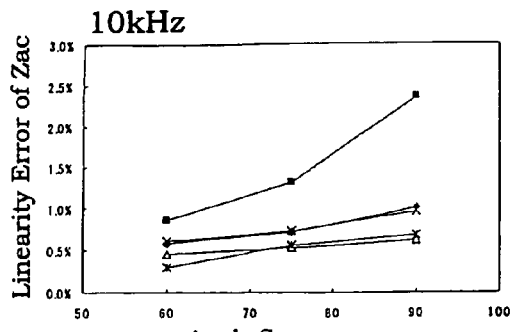
FIG. 29A
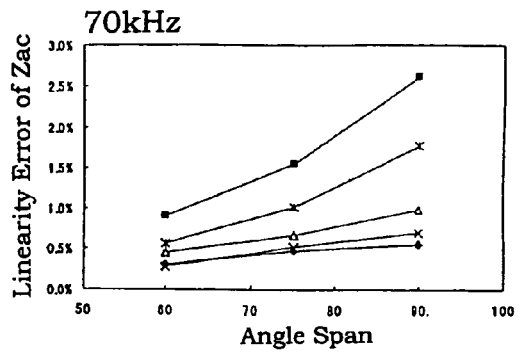
FIG. 29D
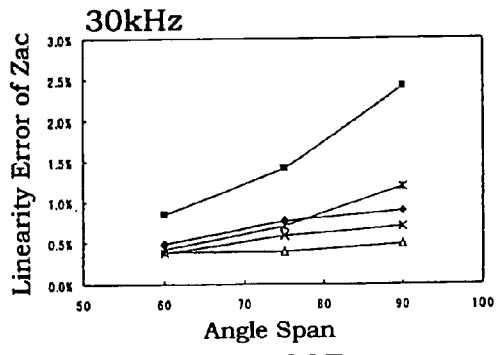
FIG. 29B
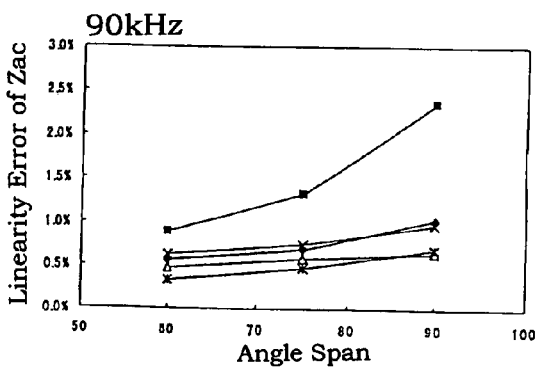
FIG. 29E
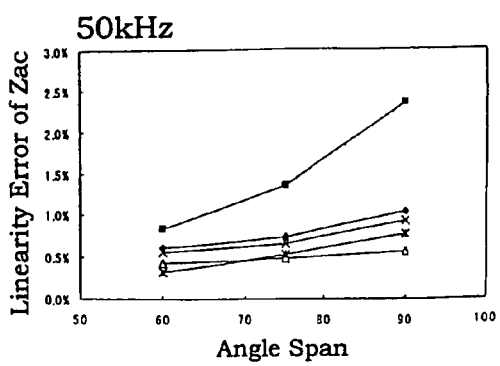
FIG. 29C

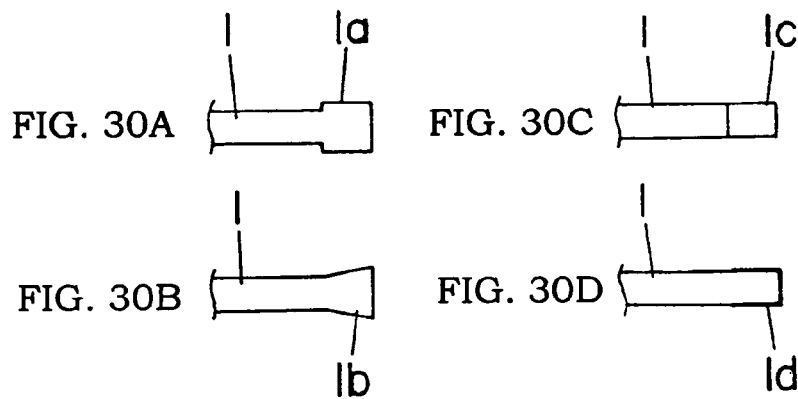
FIG. 30A  FIG. 30C
FIG. 30B  FIG. 30D
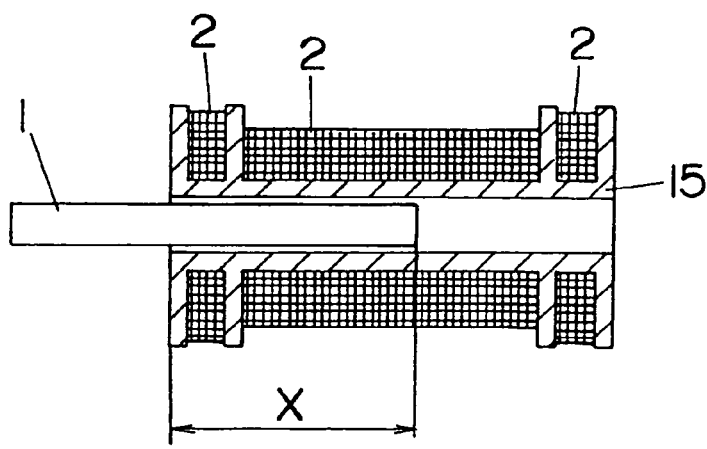
FIG. 31
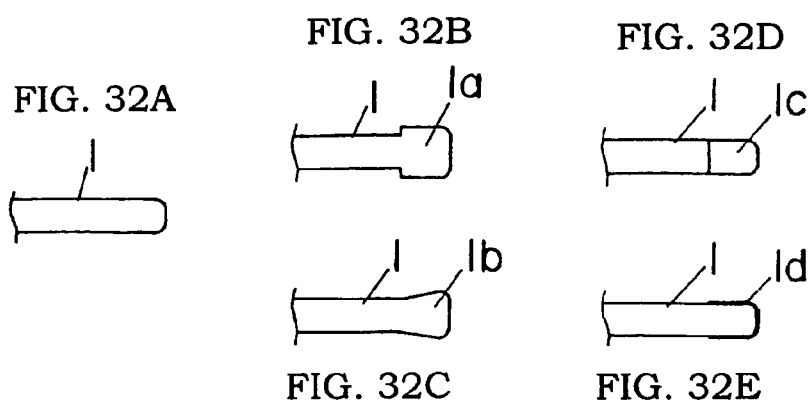
FIG. 32A
FIG. 32B
FIG. 32C
FIG. 32D
FIG. 32E

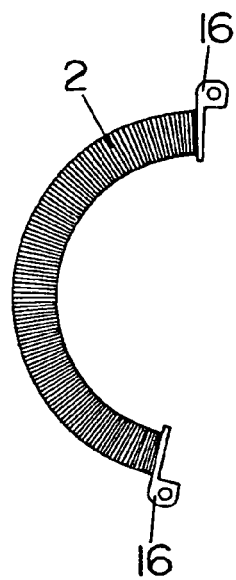
FIG. 33
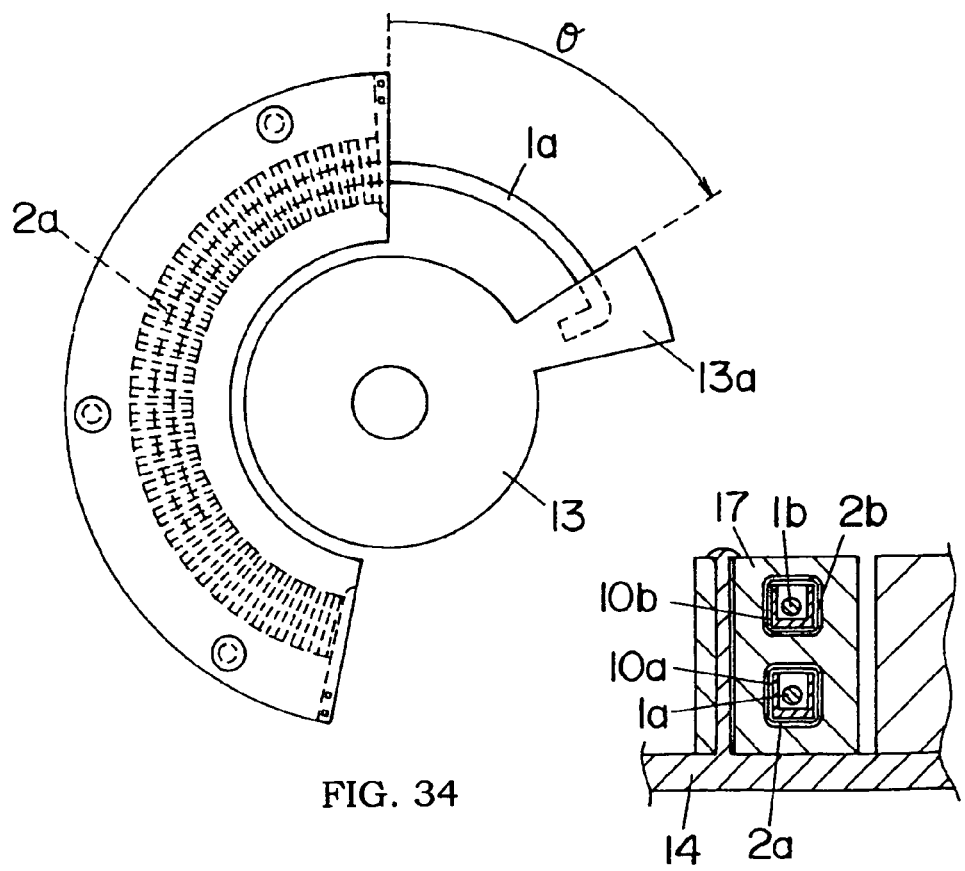
FIG. 34
FIG. 35

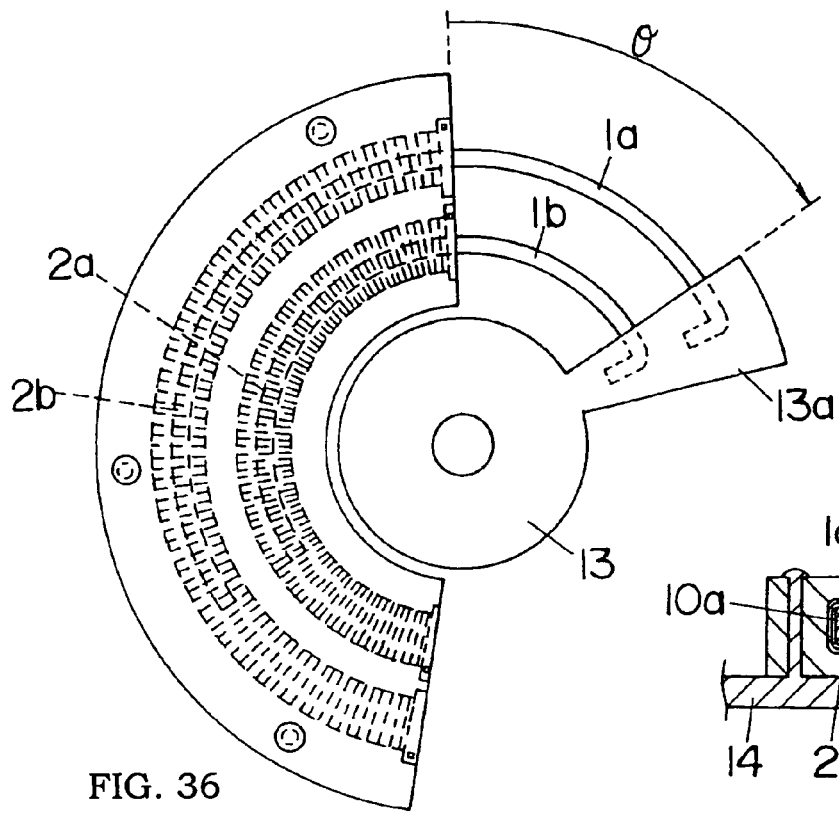
FIG. 36
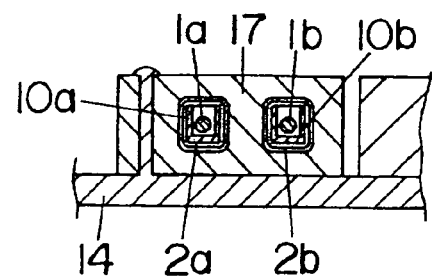
FIG. 37
FIG. 38A Vr 
FIG. 38B Vout 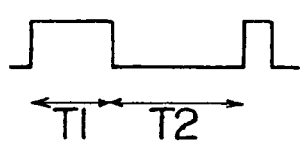
FIG. 39A Vr 
FIG. 39B Vout 
FIG. 40A Vr 
FIG. 40B Vout 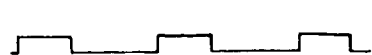

DISPLACEMENT DETECTOR

TECHNICAL FIELD

The present invention relates to a non-contact type displacement detector for detecting a displacement of a moving body.

BACKGROUND ART

In the past, a displacement detector has been proposed to detect a change in impedance of a coil portion caused by inserting a core into the coil portion, thereby providing a signal indicative of position data of the core relative to the coil portion.

This kind of displacement detector is disclosed in U.S. Pat. Nos. 5,003,258, 4,864,232, and 5,893,300. For example, as shown in FIG. 43, in a position detector disclosed in U.S. Pat. No. 5,003,258, a coil portion 2 is formed such that a change in impedance Z (inductance component) with respect to temperature resulting from a magnetic material 21 of a core 1 is cancelled by a change in impedance Z (eddy current component) with respect to temperature resulting from a nonmagnetic material 22. That is, against a problem that a temperature coefficient of the impedance Z of the coil portion depends on displacement of the core 1, the dependency of the temperature coefficient of the impedance Z on the displacement is reduced by modifying structures of the coil portion and its circumference. However, it leads to an increase in the total number of parts, and makes difficult to carry out the positioning of the parts. In addition, there are problems of a reduction in degree of freedom of design of the coil portion, increase in cost performance, and deterioration in versatility.

In addition, as another prior art, Japanese Patent Early Publication [kokai] 2000-186903 discloses a non-contact type position sensor using high-frequency magnetic field. As shown in FIG. 44, this position sensor is provided with a rotating shaft 201 rotated in conjunction with an object to be detected, arc-shaped, movable metal body 202 coupled with the rotating shaft 201 through a coupling member 202c to be moved on the circumference of a circle having the axis of the rotating shaft 201 as its center in conjunction with the rotation of the rotating shaft, a pair of sensor coils 203 (203a, 203b) fixed on the circumference of the circle, and having a center axis curved such that arms (202a, 202b) of the movable metal body 202 can come in and go out of through holes of the respective sensor coils to change an occupied area in a magnetic path, a sensor circuit for detecting a magnetic change caused depending on the occupied area of the arms 202a, 202b in the sensor coils 203a, 203b by activating those sensor coils to generate a RF modulated magnetic field, and resistances 205a, 205b for detecting coil currents flowing in the sensor coils 203a, 203b. According to this sensor, since the arms 202a, 202b of the movable metal body 202 are complementarily inserted in the sensor coils 203a, 203b, and the sensor circuit 204 detects a change in impedance of each of the sensor coils 203a, 203b, there is an advantage that accurate positioning is not needed.

However, in an angle status where the arms 202a, 202b of the movable metal body 202 are not inserted in the sensor coils 203a, 203b, the coil impedances of the sensor coils 203a, 203b are only the impedance of the coil wire. Therefore, temperature characteristics (temperature coefficients) thereof depend on only a factor of the coil wire. On the other hand, in an angle status where the arms 202a, 202b are inserted in the sensor coils 203a, 203b, the coil impedance of the sensor coils 203a, 203b has an increase in coil impedance (an increase in inductance, eddy current loss, hysteresis loss, and so on) caused by the insertions of the arms 202a, 202b, in addition to the impedance of the coil wire. In this case, since the temperature coefficient is determined by a sum of different temperature coefficients of the factors causing the increase in impedance, it is different from the temperature coefficient in the angle status where the arms 202a, 202b are not inserted in the sensor coils 203a, 203b. This means that the temperature coefficient changes depending on the insertion amount (angle). Even if digital trimming is performed to achieve a temperature compensation by a compensation circuit 210 of the sensor circuit 204, there is a problem that an accurate output can not be provided to ECU unless a complicated compensation for changing an amplification rate in response to the angle is performed. Thus, the conventional sensor still has room for improvement.

SUMMARY OF THE INVENTION

Therefore, in the above viewpoints, a concern of the present invention is to provide a displacement detector having the capability of compensating a change in temperature coefficient of the impedance of a coil portion relative to a displacement of a coil, thereby improving detection accuracy.

That is, the displacement detector of the present invention comprises:

a constant-current supply unit configured to output a constant current including an alternating current, a coil portion, to which the constant current is supplied, a magnetic core supported to be movable relative to the coil portion in a movable range, and a signal processing circuit configured to determine a displacement of the core to the coil portion in accordance with a change in output voltage of the coil portion under a condition of supplying the constant current to the coil portion. The constant-current supply unit supplies the constant current, which is obtained by superimposing a direct current on the alternating current, to the coil portion. A fluctuation width of temperature coefficient of a peak value (V1) of the output voltage of the coil portion, which is a total of DC and AC voltage components (Vdc, Vac), in the movable range is smaller than the fluctuation width of temperature coefficient of the AC voltage component (Vac) in the movable range.

According to the present invention, it is possible to increase a degree of freedom of design of the coil portion, and readily reduce the displacement dependency of the temperature coefficient of impedance of the coil portion by setting circuit constants. As a result, a change in temperature coefficient of the impedance of the coil portion depending on the displacement of the core can be compensated by a simple circuit.

Specifically, in the above displacement detector, it is preferred that at least one of a ratio between the alternating current and a direct current in the constant current, a ratio between AC and DC components of an impedance of the coil portion, a temperature characteristic of the ratio between the alternating current and the direct current in the constant current, and a temperature characteristic of the ratio between the AC and DC components of the impedance of the coil portion is determined such that the fluctuation width of temperature coefficient of the peak value (V1) is smaller than the fluctuation width of temperature coefficient of the AC voltage component (Vac).

In addition, as a preferred embodiment of the above displacement detector, the coil portion comprises a curved coil having a curvature, the core has the same curvature as the curved coil, and is rotatable about a rotation axis, and an insertion amount of the core into the curved coil is changed by rotating the core about the rotation axis. In this case, it is possible to increase a change in impedance of the coil. It is also preferred that the temperature coefficient of the DC voltage component of the output voltage of the coil portion is closer to the temperature coefficient of the AC voltage component of the output voltage of the coil portion in the case of a maximum insertion amount of the core into the curved coil than the temperature coefficient of the AC voltage component of the output voltage of the coil portion in the case of a minimum insertion amount of the core into the curved coil. The fluctuation width of the temperature coefficient of the peak value of the output voltage of the coil portion can be reduced.

In a preferred embodiment of the above displacement detector, the constant-current supply unit comprises an oscillating circuit configured to generate a voltage obtained by superimposing a DC voltage on an AC voltage, and a voltage/current conversion circuit. A ratio between the AC and DC voltages in the voltage is determined such that the fluctuation width of the temperature coefficient of the peak value (V1) is smaller than the fluctuation width of the temperature coefficient of the AC voltage component (Vac). In this case, it is preferred that the AC voltage generated by the oscillating circuit is a triangular wave.

As another preferred embodiment of the above displacement detector, the constant-current supply unit comprises an oscillating circuit configured to generate a voltage obtained by superimposing a DC voltage on an AC voltage, and a voltage/current conversion circuit. The oscillating circuit has a resistance, by which a value of the DC voltage is determined. The temperature coefficient of a value of the resistance is determined such that the fluctuation width of the temperature coefficient of the peak value (V1) is smaller than the fluctuation width of the temperature coefficient of the AC voltage component (Vac).

In a further preferred embodiment of the above displacement detector, the constant-current supply unit comprises an oscillating circuit configured to generate a voltage obtained by superimposing a DC voltage on an AC voltage, and a voltage/current conversion circuit. A temperature characteristic of frequency of the AC voltage is determined such that the fluctuation width of the temperature coefficient of the peak value (V1) is smaller than the fluctuation width of the temperature coefficient of the AC voltage component (Vac). In this case, even when it is hard to set the circuit constants because the constant-current supply unit is composed of an integrated circuit (IC), it is possible to set the temperature characteristic of the AC component of the impedance of the coil portion by selecting temperature coefficients of a resistance and a capacitor for determining an oscillating frequency of the AC voltage subject to the condition that these resistance and capacitor are placed outside.

In a still another preferred embodiment of the above displacement detector, the constant-current supply unit comprises a DC constant-current circuit and an AC constant-current circuit. At least one of a temperature characteristic of a value of direct current provided from the DC constant-current circuit, a temperature characteristic of frequency of an alternating current provided from the AC constant-current circuit, and a temperature characteristic of a value of the alternating current provided from the AC constant-current circuit is determined such that the fluctuation width of the temperature coefficient of the peak value (V1) is smaller than the fluctuation width of the temperature coefficient of the AC voltage component (Vac). In this case, it is preferred that the alternating current output from the AC constant-current circuit is a triangular wave.

In addition, as a preferred embodiment of the above displacement detector, the coil portion comprises a coil and a circuit element connected in series with the coil and having no dependency of impedance on displacement of the core. At least one of DC and AC components of the impedance of the circuit element, and temperature coefficients of the DC and AC components of the impedance of the circuit element is determined such that the fluctuation width of the temperature coefficient of the peak value (V1) is smaller than the fluctuation width of the temperature coefficient of the AC voltage component (Vac).

In a preferred embodiment of the above displacement detector, the circuit element is one of a resistance and an inductor. In this case, it is possible to control the AC impedance of the DC resistance of the coil portion at a moderate price.

In a further preferred embodiment of the above displacement detector, the constant-current supply unit is provided by an integrated circuit comprising resistances setting a magnitude of a direct current, frequency and amplitude of an alternating current, and digital trimming unit configured to set values of the resistances. The values of the resistances are determined by the digital trimming unit such that the fluctuation width of the temperature coefficient of the peak value (V1) is smaller than the fluctuation width of the temperature coefficient of the AC voltage component (Vac).

In the above displacement detector, it is preferred that the signal processing circuit comprises a rectifying circuit and a circuit configured to peak-hold an output of the rectifying circuit.

In the above displacement detector, it is preferred that the signal processing circuit has an amplifier with a temperature coefficient that is in a reverse polarity relation with the temperature coefficient of the peak value of the output voltage of the coil portion. The signal processing circuit outputs a displacement signal indicative of position data of the core relative to the coil portion in accordance with an output of the amplifier. Since the output of the amplifier depends on only the temperature-compensated displacement, it is possible to obtain a temperature-compensated displacement signal by processing this output.

Another concern of the present invention is to provide a displacement with another components for achieving the same purpose as the above. That is, the above-described displacement detector is characterized by supplying the constant current obtained by superimposing the direct current on the alternating current to the coil portion. On the other hand, the present displacement detector is characterized by adding a level shift voltage (Vsh) to a characteristic value (V1) extracted from the output voltage of the coil portion.

That is, the displacement detector of the present invention comprises:

a constant-current supply unit configured to output a constant current including an alternating current;

a coil portion, to which the constant current is supplied;

a magnetic core supported to be movable relative to the coil portion in a movable range; and a signal processing circuit configured to determine a displacement of the core to the coil portion in accordance with a change in output voltage of the coil portion under a condition of supplying the constant current to the coil portion. This displacement detector further comprises a characteristic-value extracting unit configured to extract a characteristic value (V1) from the output voltage of the coil portion, and a level shift circuit configured to add a level shift voltage (Vsh) to the characteristic value. A fluctuation width of temperature coefficient of a total (V2) of the characteristic value (V1) and the level shift voltage (Vsh) in the movable range is smaller than the fluctuation width of temperature coefficient of the characteristic value in the movable range.

According to the present invention, it is possible to avoid the occurrence of inconvenience that electric current consumption changes due to an adjustment of the temperature characteristic. In addition, since the adjustment is carried out without depending on the temperature coefficient of the DC resistance of a wiring material, there is an effect that a change in temperature coefficient of the impedance of the coil portion relative to the displacement of the coil can be compensated by a simple circuit. In other words, to achieve the purpose of the present invention, a relatively small level shift value is added to the characteristic value by the level shift circuit. Therefore, it is particularly effective when there is a limitation in electric current consumption. Thus, a further advantage can be presented in comparison with the displacement detector comprising the constant-current supply unit for supplying, to the coil portion, the constant current obtained by superimposing the direct current on the alternating current.

It is preferred that the above-described displacement detector further comprises a unit configured to adjust at least one of a temperature coefficient and a magnitude of the level shift voltage. By reducing variations in temperature characteristic due to production lot, the temperature characteristic can be adjusted with higher accuracy. Alternatively, a magnitude of digital quantity of the level shift voltage may be adjusted by the level shift circuit.

In the above displacement detector, it is preferred that the signal processing circuit comprises a peak-hold circuit as the characteristic-value extracting unit, A/D conversion circuit configured to convert the characteristic value into a digital signal, which is disposed between the peak-hold circuit and the level shift circuit, and a temperature compensation circuit configured to perform a temperature compensation to an output of the level shift circuit. In this case, it is possible to readily perform calibration with accuracy.

In the displacement detector described above, it is preferred that the characteristic value is one of a peak value of the output voltage of the coil portion, bottom value of the output voltage of the coil portion, and a value proportional to an amplitude of the output voltage of the coil portion.

In each of the displacement detectors described above, it is preferred that the coil portion has a curved coil having a curvature, and the curved coil is fixed to a housing having a unit configured to correct a change in curvature of the curved coil. In this case, it is possible to correct or prevent the change in curvature of the curved coil.

As a preferred embodiment of each of the above displacement detectors, the core is provided by a plurality of curved cores having a same curvature, which are supported to be rotatable about a single rotation axis. The coil portion comprises a plurality of coils having a same curvature as the curved cores, which are spaced from each other in the axial direction of the rotation axis. Insertion amounts of the curved cores into the coils are changed by rotating the curved cores about the rotation axis. In this case, an opening angle of the winding wire of the curved coil and a mechanical rotation angle of a movable block can be increased. Therefore, a wide range of the rotation angle with good impedance linearity of the coil portion is obtained. In addition, when two coils having the same specification are used, their coil characteristics are identical to each other. Therefore, there are advantages in the aspects of winding process and cost performance.

In another preferred embodiment of each of the above displacement detectors, the coil portion is provided by a pair of inner and outer coils having different curvatures and disposed to be curved in substantially parallel with each other. The core comprises a first core curved at a same curvature as the inner core and supported to be rotatable about a rotation axis, and a second core curved at a same curvature as the outer core and supported to be rotatable about the rotation axis. An insertion amount of the first core into the inner core is changed by rotating the first core about the rotation axis, and an insertion amount of the second core into the outer core is changed by rotating the second core about the rotation axis. In this case, an opening angle of the winding wire of the curved coil and a mechanical rotation angle of a movable block can be increased. In addition, it is possible to provide a thinned displacement detector.

In a further preferred embodiment of each of the above displacement detectors, the signal processing circuit comprises a signal compensation circuit composed of an A/D conversion circuit configured to convert a peak value of the output voltage of the coil portion into a digital signal, and a compensation circuit configured to for digital trimming the digital signal. In a system (ECU) for receiving and treating an output of the displacement detector, which is composed of a digital circuit, when the output of the displacement detector is an analog signal, there is a fear that an error or a response delay occurs due to additional repetition of A/D conversion or D/A conversion. However, in this embodiment, since the output of the displacement detector is a digital signal, such a problem does not occur. In addition, the influence of external noise at the time of signal transmission can be prevented, as compared with the case of outputting the analog signal.

Further characteristics of the present invention and effects brought thereby will be clearly understood from the best mode for carrying out the invention described below.

BRIEF EXPLANATION OF THE DRAWINGS

FIG. 1 is a circuit diagram of a displacement detector according to the first embodiment of the present invention;

FIG. 2 is a top view of the displacement detector;

FIG. 3 is a cross-sectional view of the displacement detector taken along the line A-A' in FIG. 2;

FIG. 4 is a partially enlarged view of FIG. 3;

FIG. 5 is a waveform diagram of an output voltage from a coil of the displacement detector;

FIG. 28 is a diagram showing characteristics of magnetic materials used for cores in the fifth embodiment of the present invention;

FIGS. 29A to 29E are graphs each showing a relation of linearity between AC impedance of the coil and angle span of the magnetic materials at the respective frequency;

FIGS. 30A to 30D are end-shape views of cores;

FIG. 31 is a cross-sectional view of a linear-stroke type displacement detector;

FIGS. 32A to 32E are end-shape views of the cores with removed edges;

FIG. 33 is a plan view of a coil having supporting/fixing members at its both end portions;

FIG. 34 is a top view of a displacement detector with a pair of coil portions according to the sixth embodiment of the present invention;

FIG. 35 is a partially cross-sectional view of the displacement detector of FIG. 34;

FIG. 36 is a top view of another displacement detector with a pair of coil portions according to the sixth embodiment of the present invention;

FIG. 37 is a partially cross-sectional view of the displacement detector of FIG. 36;

FIGS. 38A and 38B are diagrams showing displacement signals in the seventh embodiment of the present invention;

FIGS. 39A and 39B are diagrams showing another displacement signals in the seventh embodiment of the present invention;

FIGS. 40A and 40B are diagrams showing still another displacement signals in the seventh embodiment of the present invention;

BEST MODE FOR CARRYING OUT THE INVENTION

Figure 6:
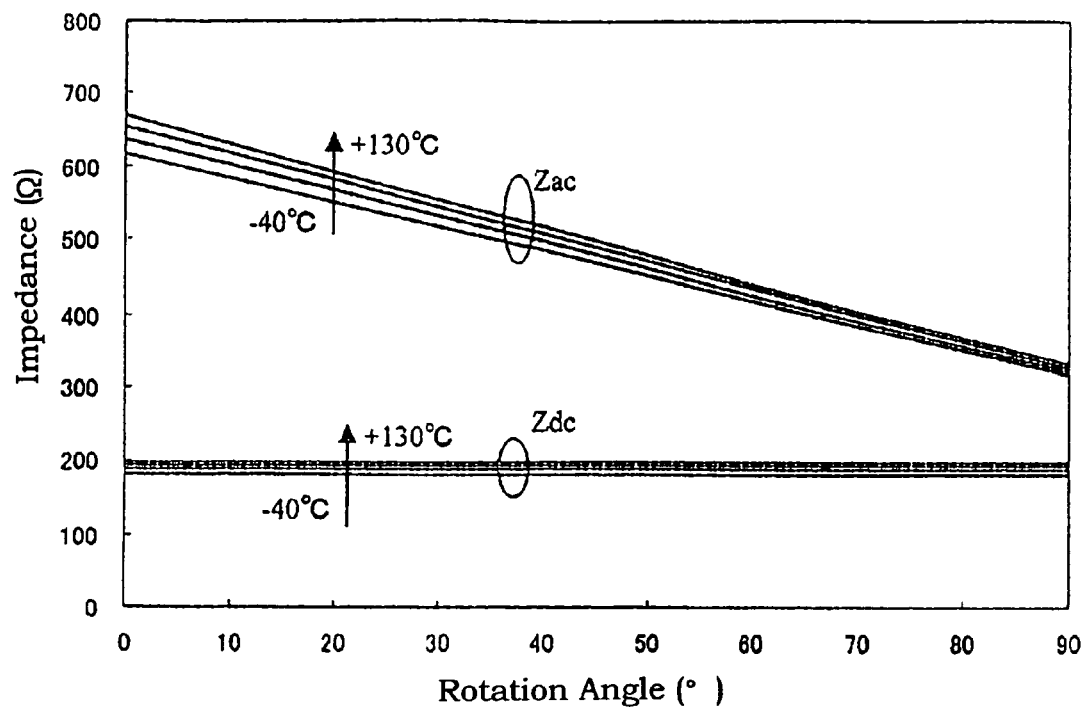
FIG. 6 is a graph showing a relation between impedance of the coil and rotation angle of a core of the displacement detector.

A displacement detector of the present invention is explained in detail according to the following preferred embodiments, referring to the attached drawings.

First Embodiment

As shown in FIGS. 1 to 4, a displacement detector of the present embodiment has a coil 2, movable block 13, and a magnetic core 1. The coil 2 is wound around a curved bobbin 10 curved at a constant curvature and having a U-shaped cross section, on the inside of which a coating 11 is formed. The movable block 13 is composed of a cylinder solid having a center of the curvature of the curved coil 2 as a rotation axis, and a projection 13a formed on the outer surface of the cylinder solid. The magnetic core 1 is connected at its one end to the projection 13a, and curved at a constant curvature such that the magnetic core can be inserted in a cavity portion of the curved coil 2. The displacement detector further includes a curvature correcting member 12 for correcting a change in curvature of the coil 2, housing 14 having a mounting surface, on which respective parts are mounted, constant-current circuit 3 for providing, to the coil 2, a constant current Id obtained by superimposing an alternating current Iac having required frequency f and amplitude on a required magnitude of a direct current Idc, and a signal processing circuit 4 for providing a displacement signal Vout indicative of position data of the core 1 relative to the coil 2 in response to a peak value V1 of a voltage Vs (detecting signal) detected at both ends of the coil 2, which is determined by the constant current Id provided from the constant-current circuit 3 and the impedance Z of the coil 2. The coil 2 includes a coil potion A, to which the constant current Id is supplied, and from which the detecting signal is output. The curved bobbin 10 may have a cross section other than the U-shape. As a winding wire of the coil, for example, it is preferred to use nichrome, Manganin, or a copper-nickel alloy. In the present embodiment, as the rotation angle Θ of the movable block 13 changes from 0° to 90°, a region of the coil 1 inserted in the core 2 decreases.

The constant-current circuit 3 is composed of an oscillating circuit 3a for generating a constant voltage Vd' obtained by superimposing an AC voltage Vac' having required frequency f and amplitude on a required magnitude of a DC voltage Vdc', and a voltage-current conversion circuit 3b for converting the constant voltage Vd' provided from the oscillating circuit 3a into the constant current Id.

In the above displacement detector, as shown in FIG. 1, the alternating current Iac and the direct current Idc are simultaneously supplied from the constant-current circuit 3 to the coil 2. When "Zdc" designates DC resistance of the coil 2, "Zac" designates AC impedance at the oscillation frequency f of the AC current Iac, and "Vs" designates the voltage detected at the both ends of the coil 2, the voltage Vs is a sum of the DC voltage Vdc and the AC voltage Vac, as represented by the following equation.

$$Vs=Vdc+Vac=Idc*Zdc+Iac*Zac \quad (1)$$

In the equation (1), values are complex numbers. However, when considering only the peak voltage V1 of the voltage Vs, the voltage V1 is represented by the equation (2).

$$V1=Vdc+Vac=Idc*Zdc+Iac*Zac \quad (2)$$

In the Equation (2), values can be handled as real numbers. Therefore, as shown in FIG. 5, the waveform has the peak voltage V1 that is the sum of the DC voltage Vdc and the AC voltage Vac.

The displacement detector of the present embodiment is characterized in that a fluctuation width of temperature coefficient of the peak value (V1) of the output voltage of the coil 2, which is the sum of the DC voltage component (Vdc) and the AC voltage component (Vac), in the movable range is smaller than the fluctuation width of temperature coefficient of the AC voltage component (Vac) in the movable range.

By the way, in the displacement detector, an output linearity error of a signal detected in a required displacement zone is regulated at room temperature. By giving a constant margin to it, the regulation becomes possible over the entire operation temperature range. For example, it can be regulated as follows: "when an angle range Θ for position detection=0° to 90°, the linearity error of the detected signal is ±1% FS or less at room temperature, and ±2% FS or less in the range of −40° C. to +130° C". This means that a deterioration of the linearity error due to temperature fluctuation factors must be controlled within a range of approximately ±1% FS. In addition, when the room temperature is 30° C., there is a temperature width of 100° C. at the high temperature side. Assuming that the detected signal of the coil portion A linearly changes with respect to temperature, it means that a fluctuation width of temperature change ratio (temperature coefficient) must be controlled within a range of ±100 ppm/K.

In addition, with respect to a displacement in a required displacement zone, when the fluctuation width Δ(dV1/dT) of the temperature coefficient of the peak value of V1 of the voltage Vs detected at both ends of the coil 2 is within the range of ±100 ppm/K, it is possible to obtain a temperature-compensated voltage within the range of a room temperature value for the displacement ±100 ppm/K by the addition of a simple temperature compensation circuit having a constant temperature coefficient. This is a goal of the present invention.

FIG. 6 is a sample data prepared from actual measurement value of impedance of the coil 2 obtained by winding a copper-nickel alloy wire (GCN 15 wire). In this graph, the DC resistance Zdc and the AC impedance Zac of the coil 2 are plotted, and the horizontal axis is the rotation angle Θ of FIG. 2. The impedance was set to perfectly linearly change with respect to the rotation angle Θ. This is fairly close to the actual measurement value. In FIG. 6, Zac and Zdc at the ambient temperatures; −40° C., +25° C., +85° C., +130° C. are respectively shown.

At the ambient temperature +25° C., the DC resistance Zdc is 188 Ω, the temperature coefficient is 511 ppm/K, and the AC impedance Zac is represented by:

$$Zac=(Z0+Z'*\Theta)*\{1+(\beta 0+\beta'*\Theta)*T\} \quad (3)$$

wherein Z0=636 Ω, Z'=−3.48 Ω/deg, β0=478 ppm/K, β'=−2.49 ppm/K/deg, Θ is the rotation angle, and T is ambient centigrade temperature. In addition, the temperature coefficient of the AC impedance Zac is 478 ppm/K at Θ=0°, and 254 ppm/K at Θ=90°. Therefore, the fluctuation width Δ (dZac/dT) reaches 224 ppm/K.

Figure 7:
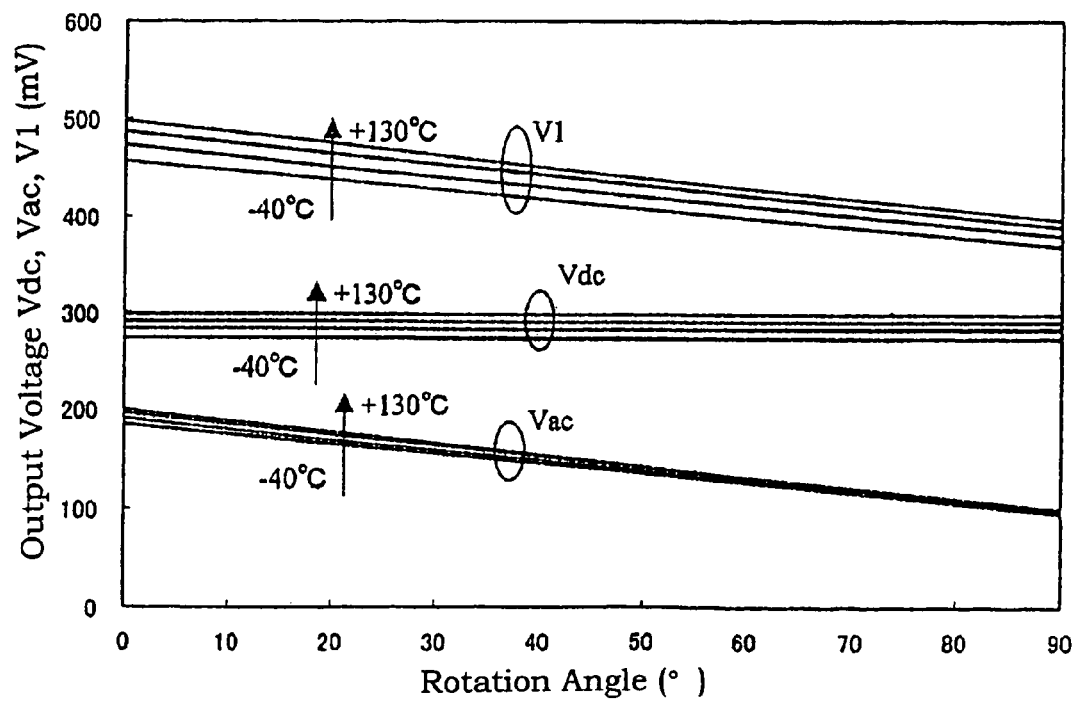
FIG. 7 is a graph showing a relation between output voltage of the coil and rotation angle of the core of the displacement detector.
Figure 8:
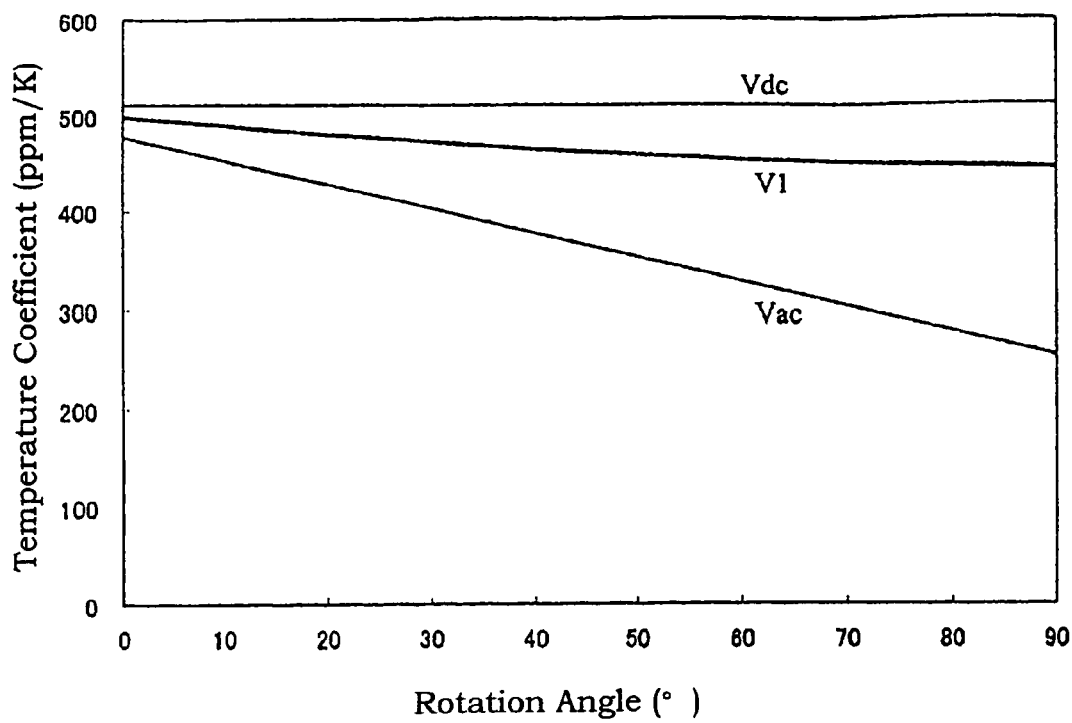
FIG. 8 is a graph showing a relation between temperature coefficient of the output voltage of the coil and rotation angle of the core of the displacement detector.

Next, under a condition that the constant-current circuit 3 outputs 1.5 mA of the direct current Idc, and 0.3 mA of the alternating current Iac, results of the DC voltage Vdc, AC voltage Vac, and the peak voltage V1 detected at both ends of the coil 2 are plotted in FIG. 7 by use of the above equation (2), in which the temperature change ratios of the frequency f, direct current Idc and the alternating current Iac are zero for simplicity. FIG. 8 shows the temperature coefficients of them.

As understood from FIG. 8, the temperature coefficient of the peak voltage V1 is approximately 450 to 500 ppm/K over the rotation angle Θ=0° to 90°, and the fluctuation width Δ (dV1/dT) is approximately 50 ppm/K, which is much narrower than the fluctuation width of the AC impedance Zac. Therefore, by performing a temperature compensation of 470 ppm/K to the peak voltage V1, the compensated voltage practically equal to the room temperature value can be obtained without error.

Figure 9:
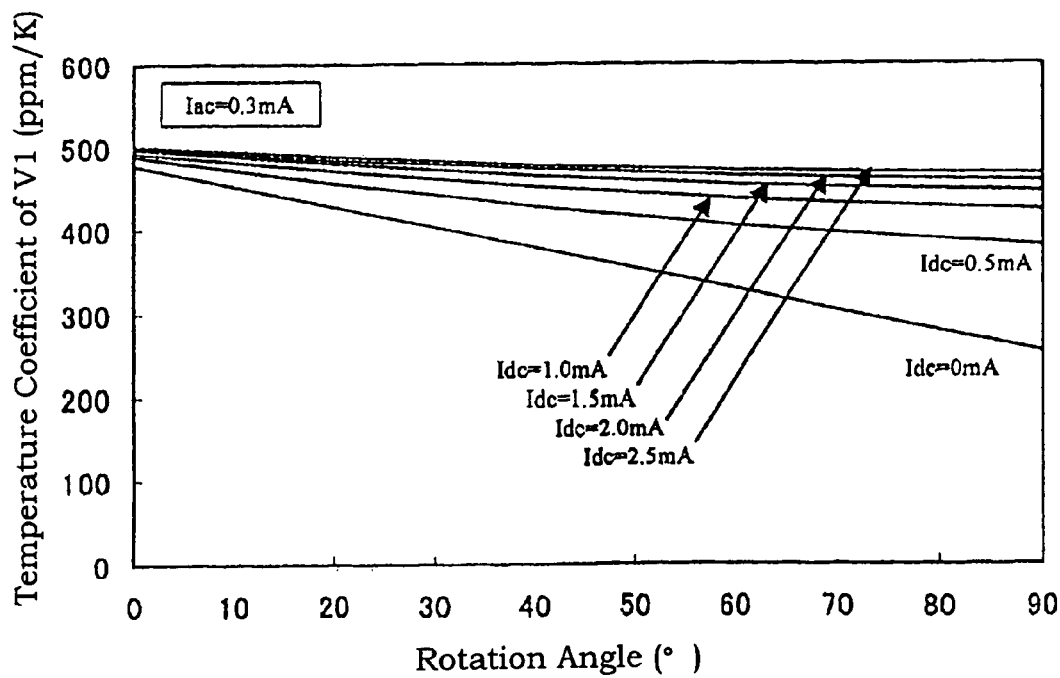
FIG. 9 is a graph showing a relation between temperature coefficient of a peak voltage of the coil and rotation angle of the core of the displacement detector.

Under a condition of changing the direct current Idc, while keeping 0.3 mA of the alternating current Iac output from the constant-current circuit 3, results of the temperature coefficient of the peak voltage V1 calculated in the same manner as FIG. 8 are plotted in FIG. 9. When the direct current Idc=0, displacement dependency of the temperature coefficient is identical to the displacement dependency of the impedance Z of the coil 2. However, as the direct current Idc increases, it becomes closer to the temperature coefficient of the DC voltage Vdc. In addition, as the insertion amount of the core 1 in the coil 2 decreases (In this embodiment, as the rotation angle Θ increases), the influence of the DC voltage Vdc easily occurs because a percentage of the DC voltage Vdc in the peak voltage V1 is larger.

When the direct current Idc is slightly mixed, the fluctuation width Δ (dV1/dT) of the temperature coefficient of the peak voltage V1 can be considerably improved in comparison with the case of the direct current Idc=0. As the direct current Idc increases, the fluctuation width Δ(dV1/dT) of the temperature coefficient of the peak voltage V1 is smaller, and then saturated at a level. Therefore, since there is a case that increasing the direct current Idc leads to an increase of electric current consumption, an appropriate value of the direct current Idc should be selected in consideration of a permissible electric-current consumption and the value of fluctuation width Δ (dV1/dT) of the temperature coefficient of the peak voltage V1. At this time, by respectively setting the DC voltage Vdc' and the AC voltage Vac' generated by the oscillating circuit 3a, it is possible to determine a ratio between the direct current Idc and the alternating current Iac of the constant current Id.

In addition, as the frequency f of the AC voltage Vac' generated by the oscillating circuit 3a is higher, a proportion of the AC voltage Vac to the DC voltage Vdc increases. Therefore, by appropriately selecting the frequency f, it is possible to properly determine the ratio between Vdc and Vac. In the above explanation, the temperature change ratio of each of the frequency f, direct current Idc and the alternating current Iac are zero. However, when these have the temperature coefficients, each of the temperature coefficients of the DC voltage Vdc and the AC voltage Vac shifts up and down in FIG. 8, so that a change in temperature characteristic of the peak voltage V1 occurs.

As understood from FIGS. 8 and 9, when the insertion amount of the core 1 is small, (dV1/dT) considerably receives the influence of (dVdc/dT), and when the insertion amount of the core 1 is large, it considerably receives the influence of (dVac/dT). This can be clearly understood from the composition ratio of the DC voltage Vdc and the AC voltage Vac in the peak voltage V1.

Regardless of the insertion amount of the core 1, the value of (dV1/dT) exists between the values of (dVdc/dT) and (dVac/dT). When minimizing a difference between the value of (dVac/dT) and the value of (dVdc/dT) in the case of a large insertion amount of the core 1 (at the vicinity of the rotation angle Θ=0° in this embodiment), (dV1/dT) becomes a value close to (dVdc/dT) in the case of a small insertion amount of the core 1 (it is easy to receive the influence of the temperature coefficient of the DC voltage Vdc by nature) as well as the case of the large insertion amount of the core 1 (Although it is easy to receive the influence of the temperature coefficient of the AC voltage Vac, the DC voltage Vdc is close to the AC voltage Vac). As a result, it is readily reduce the fluctuation width Δ(dV1/dT) of the temperature coefficient of the peak voltage V1.

Furthermore, the fluctuation width Δ(dV1/dT) of the temperature coefficient of the peak voltage V1 can be reduced in the case that the value of (dVdc/dT) is close to the value of (dVac/dT) at the maximum insertion amount of the core 1, in comparison with the case that the value of (dVdc/dT) is close to the value of (dVac/dT) at the minimum insertion amount of the core 1.

Specifically, (dVdc/dT) and (dVac/dT) can be controlled by appropriately setting values of the temperature coefficients of the frequency f, alternating current Iac, and the direct current Idc, AC impedance Zac, and the DC resistance Zdc, according to the following methods.

First, the temperature coefficient of the DC resistance Zdc is determined by the selection of the winding material of the coil 2. As the winding material, since a regular copper wire has a very large temperature coefficient, it is practical to use a nichrome wire, Manganin wire, or a copper-nickel alloy wire (GCN wire). In the case of using the copper-nickel alloy wire, volume resistivity and its temperature coefficient can be determined according to the compounding ratio between copper and nickel.

Figure 10:
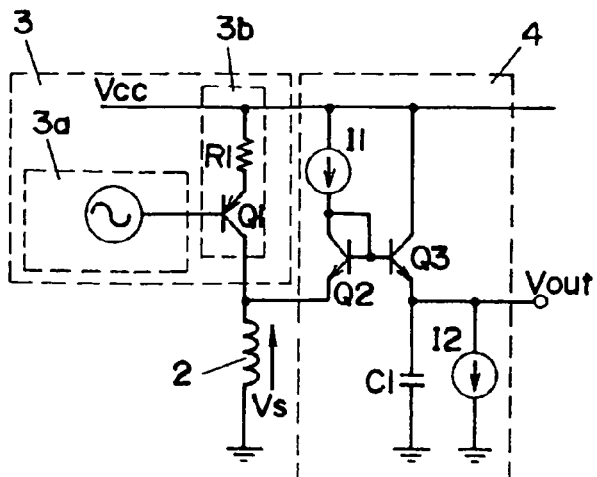
FIG. 10 is a circuit diagram illustrating an constant-current circuit and a signal processing circuit of the displacement detector.
Figure 11:
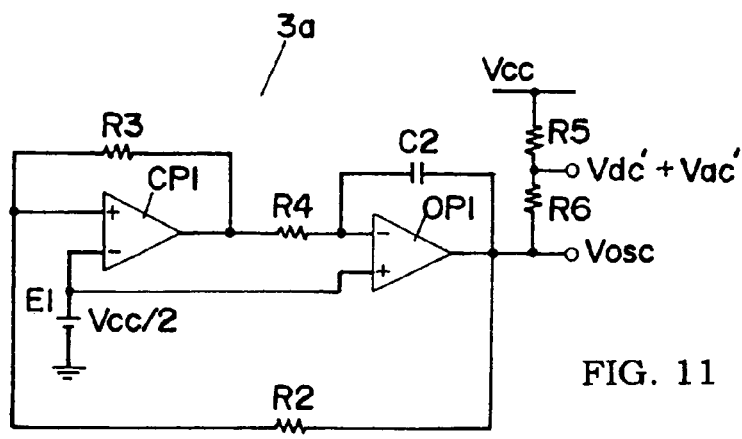
FIG. 11 is a circuit diagram illustrating an oscillating circuit of the displacement detector.

Next, a method of giving appropriate temperature coefficients to the direct current Idc, alternating current Iac, and the frequency f is explained. As shown in FIG. 10, the constant-current circuit 3 is composed of the oscillating circuit 3a for providing the voltage Vdc'±Vac', and a voltage-current conversion circuit 3b. The oscillating circuit 3a is, as shown in FIG. 11, comprises a comparator CP1, resistance R3 connected between an output terminal and a noninverting input terminal of the comparator CP1, DC power source E1 connected between the ground and an inverting input terminal of the comparator CP1 to provide a voltage Vcc/2, resistance R4 connected at its one end with the output terminal of the comparator CP1, operational amplifier OP1 having an inverting input terminal connected to the opposite end of the resistance R4 and a noninverting input terminal connected to the DC power source E1, capacitor C2 connected between the output terminal and the inverting input terminal of the operational amplifier OP1, resistance R2 connected between the output terminal of the operation amplifier OP1 and the noninverting input terminal of the operation amplifier OP1, and a series circuit of resistances R5, R6 connected between the output terminal of the operation amplifier OP1 and a control power source Vcc.

On the other hand, the voltage-current conversion circuit 3b is composed of a resistance R connected at its one end with the control power source Vcc, and a PNP-type transistor Q1 having an emitter connected to the opposite end of the resistance R1, base connected to the oscillating circuit 3a and a collector connected to the coil 2.

The signal processing circuit 4 uses a peak-hold type rectification circuit as a circuit for picking up the peak voltage V1. This circuit comprises a constant current source I1 connected at its one end with the control power source Vcc, NPN-type transistor Q2 having a collector connected to the opposite end of the constant current source I1, base connected to the collector, and an emitter connected to the coil 2, NPN-type transistor Q3 having a collector connected to the control power source Vcc, and a base connected to the base of the transistor Q2, and a parallel circuit of a capacitor C1 connected between the ground and an emitter of the transistor Q3, and a constant current source 12. A voltage detected at both ends of the capacitor C1 is a peak-hold voltage obtained by rectifying the voltage Vs detected at both ends of the coil 2, i.e., the peak voltage V1, which is output as a displacement signal Vout.

To remove the influence of RF noises superimposed on the coil, it is preferred to dispose a low-pass filter at the input side of the signal processing circuit. In this case, it is possible to effectively remove the influence of the RF noises including harmonic components of a coil driving current and radiation noises from outside.

It is preferred that alternating current output from the constant-current circuit 3 is a triangular wave. In the above circuit, the output Vosc of the operation amplifier OP1 is the triangular wave having an offset center of Vcc/2. The Dc voltage Vdc' and the AC voltage Vac' are determined by dividing the output Vosc with the resistances R5, R6. Such a triangular-wave oscillating circuit can realize a circuit stable to temperature changes by a simple configuration, as compared with a sine-wave oscillating circuit. When a square-wave current is supplied to the coil 2, a signal voltage occurs, which is hard to control due to di/dt of the square-wave current. Therefore, the square-wave oscillating circuit can not be used. In the case of using the triangular wave, it is possible to obtain the output voltage, to which the rotation angle Θ of the core is reflected, as well as the case of using the sine wave.

In FIG. 11, the oscillating frequency f of the AC voltage Vac' is in proportion to (R3/(C2×R4×R2)), and the amplitude is in proportion to (R2/R3). Therefore, by appropriately setting the temperature coefficients and the values of the capacitor C2 and the resistances R2 to R6, it is possible to control the temperature coefficients and the values of the DC voltage Vdc' and the AC voltage Vac'. In particular, even when the constant-current circuit 3 is formed as a whole by a monolithic IC, the capacitor C2 is often disposed outside. Therefore, the method of adjusting the temperature coefficient with the capacitor C2 is effective.

In addition, when the constant-current circuit 3 is formed as a whole in a monolithic IC manner, appropriate temperature coefficients can be provided to the frequency f, alternating current Iac and the direct current Idc by setting resistance values of a part of the resistances R1 to R5 or all of them by digital trimming. In this case, even when the core 1, coil 2 and the displacement zone are changed, it is not needed to exchange the IC, and therefore versatility is high.

In the above, the digital trimming means carrying out a resistance adjustment by connecting a resistance to be adjusted to a parallel circuit of a resistance and a switching element in parallel, and then turning on/off the switching element according to digital data. Specifically, in the case of carrying out the digital trimming, an optimum code of the digital data is determined, while electric characteristics being monitored, and then the determined optimum code is written in a ROM of the IC, or a fuse for data storage formed in the IC is burned out, so that the optimum code is given to the IC, and the resistance in the IC is set to a value corresponding to this optimum code. As the triangular-wave oscillating circuit, another circuit configuration other than FIG. 11 may be used.

Figure 12:
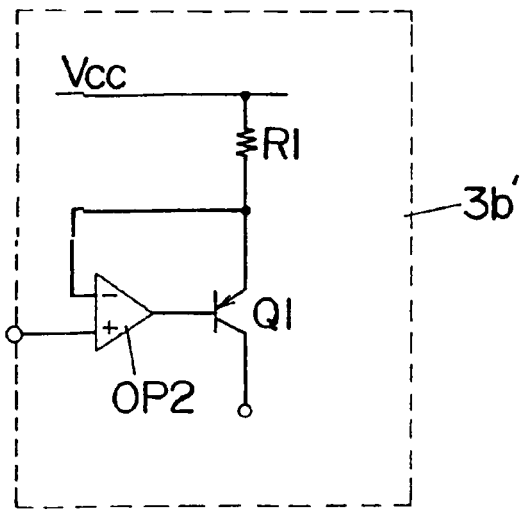
FIG. 12 is a circuit diagram illustrating a voltage-current conversion circuit of the displacement detector.

In the voltage-current conversion circuit 3b of FIG. 10, even when the temperature coefficient of the DC voltage Vdc' generated by the oscillating circuit 3a is zero, the direct current Idc supplied to the coil 2 has a positive temperature coefficient due to the temperature characteristic of the voltage Vbe between the base and the emitter of the transistor Q1. In the case that the positive temperature coefficient of the direct current Idc is not desired, a voltage-current conversion circuit 3b' of FIG. 12 may be used, which comprises an additional operation amplifier OP2 having an inverting input terminal connected to the emitter of the transistor Q1 of the voltage-current conversion circuit 3b shown in FIG. 10, output terminal connected to the base of the transistor Q1, and a noninverting input terminal connected to the output of the oscillating circuit 3a.

Figure 13:
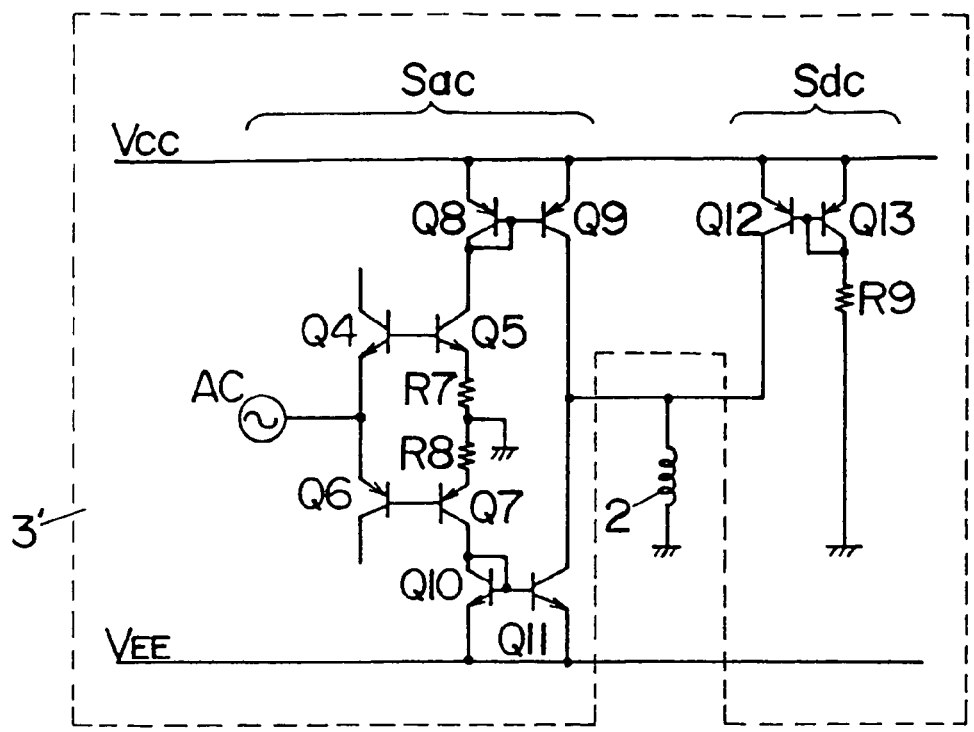
FIG. 13 is a circuit diagram illustrating another constant-current circuit of the displacement detector.

FIG. 13 shows a circuit configuration of a constant-current circuit 3' different from the constant-current circuit 3 of FIG. 10. The constant-current circuit 3' is composed of an alternating current supply circuit Sac and a direct current supply circuit Sdc. The alternating current supply circuit Sac is formed with a series circuit of a NPN-type transistor Q4 and a PNP-type transistor Q6, AC power source AC connected to the midpoint between the transistors Q4 and Q6, series circuit connected between the control power source Vcc and Vee, which is composed of a PNP-type transistor Q8, NPN-type transistor Q5, resistances R7, R8, PNP-type transistor Q7 and a NPN-type transistor Q10, and a series circuit of a PNP-type transistor Q9 and a NPN-type transistor Q11. The gates of the transistors Q4 and Q5 are connected to each other. The gates of the transistors Q6 and Q7 are connected to each other. The gates of the transistors Q8 and Q9 are connected to each other. The gates of the transistors Q10 and Q11 are connected to each other. In each of the transistors Q8 and Q11, the base is short-circuited to the collector.

The direct current supply circuit Sdc is formed with a PNP-type transistor Q12 having a collector connected to the midpoint between the transistors Q9 and Q11, and an emitter connected to the control power source Vcc, PNP-type transistor Q13 having an emitter connected to the control power supply Vcc, and a resistance R9 connected between the ground and the collector of the transistor Q13. The gates of the transistors Q12, Q13 are connected to each other, and the base of the transistor Q13 is short-circuited to the collector thereof.

The coil 2 is connected at its one end to the midpoint between the transistors Q9 and Q12. Since the alternating current supply circuit Sac for supplying the alternating current Iac is independent from the direct current supply circuit Sdc for supplying the direct current Idc, it is possible to simply control a ratio between the direct current Idc and the alternating current Iac and the temperature coefficient. Furthermore, they can be set by digital trimming.

When the signal processing circuit 4 comprises an amplifier having a reverse polarity temperature coefficient against the temperature coefficient of the peak voltage V1 of the output voltage of the coil portion A, and the displacement signal Vout is output according to an output of this amplifier, the output of this amplifier depends on only the temperature compensated displacement. Therefore, a temperature compensated displacement signal can be obtained by processing this output.

Figure 14:
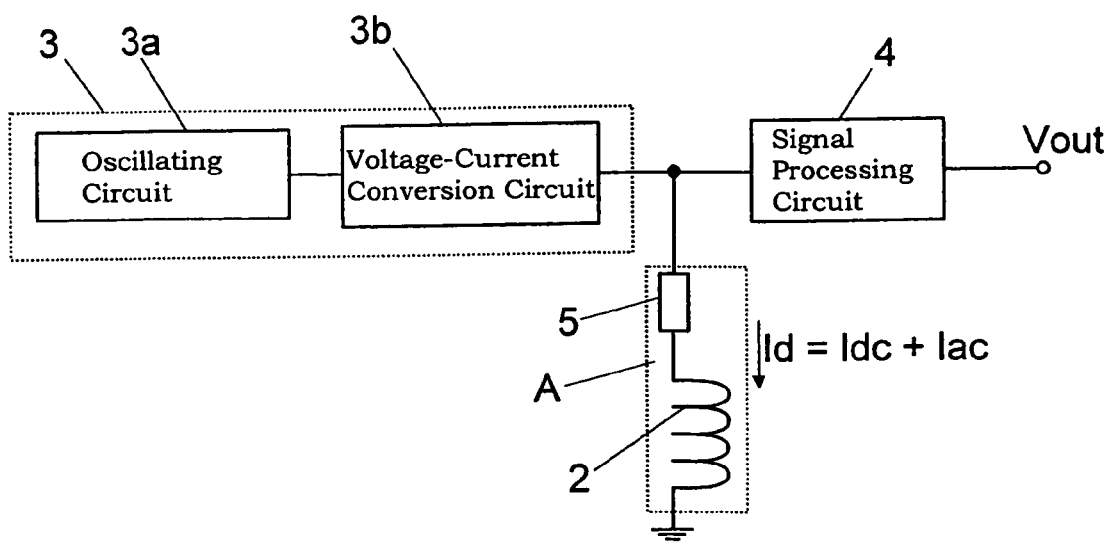
FIG. 14 is a diagram illustrating another circuit configuration of the displacement detector.

In addition, it is possible to control the temperature coefficients and the values of the DC resistance Zdc and the AC impedance Zac in addition to the constant-current circuit 3. In place of the coil portion A explained in FIG. 14, a coil portion A is used, which comprises a circuit element 5 composed of a DC resistance Zdc' and an AC impedance Zac' and connected in series to the coil 2. At this time, the DC resistance Zdc' and the AC impedance Zac' of the circuit element 5 have no relation with the rotation angle $\Theta$ of the core 1. Therefore, by appropriately selecting the temperature coefficients and the values of the DC resistance Zdc' and the AC impedance Zac', it is possible to control the temperature coefficient and the peak value of the voltage detected at both ends of the coil portion A.

For example, when the circuit element 5 is a pure resistance, the AC impedance Zac' becomes R (resistance value). When the circuit element 5 is an inductance, it has both of the DC resistance Zdc' and the AC impedance Zac'. Furthermore, when a diode is used in the circuit element 5, it is possible to give an influence only to the DC component Vdc of the voltage Vs detected at both ends of the coil 2.

As explained above, by applying both of the alternating current Iac and the direct current Idc to the coil 2, the fluctuation width $\Delta(dV1/dT)$ of the temperature coefficient of the signal voltage in the displacement zone (rotation angle $\Theta$ can be remarkably reduced. Of course, as $\Delta(dZac/dT)$ is smaller, the fluctuation width $\Delta(dV1/dT)$ can be further reduced.

To reduce $\Delta(dZac/dT)$, it is desired that the core 1 is a magnetic material having a small temperature coefficient of magnetic permeability or electric resistivity. There is not a significant difference in the temperature coefficient of magnetic permeability among magnetic materials, for example, in the temperature range of −40 to +130° C. Therefore, it is particularly preferred to use the magnetic material having a small temperature coefficient of electric resistivity. For example, such a magnetic material comprises a nickel-chromium alloy, nickel-chromium-iron alloy, iron-chromium-aluminum alloy, copper-nickel alloy and Manganin. These metal materials are popularly used as heating wires, and available at a very low price. Therefore, when the core 1 is formed by cutting a heating wire to a required length, and bending the heating wire, it is possible to further reduce the fluctuation of the coil impedance with respect to temperature in the case that the core is inserted, and also minimize a loss of the material. Thus, the core 1 with excellent temperature characteristics can be produced at a low price.

Figure 15:
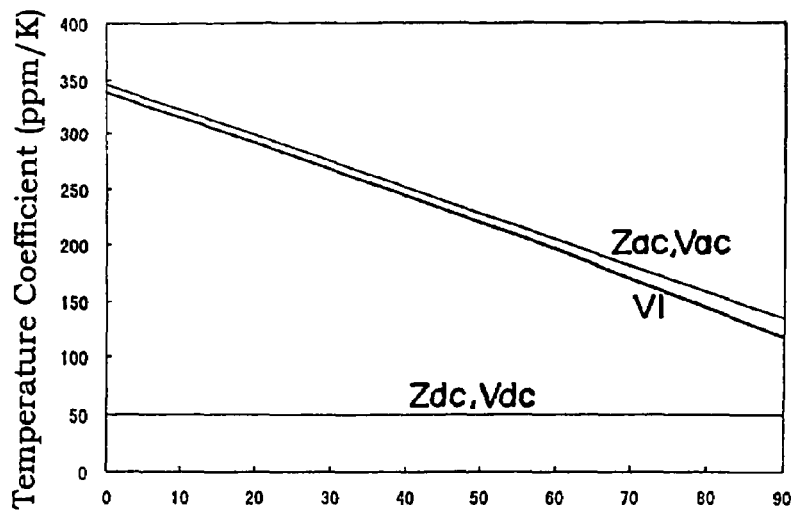
FIG. 15 is a reference diagram showing a relation between temperature coefficient of the output voltage of the coil and rotation angle of the core.

As explained below, there is a case that $\Delta(dV1/dT)$ becomes larger than the $\Delta(dZac/dT)$ when the direct current idc, alternating current Iac, DC resistance Zdc, and the AC resistance Zac and the temperature coefficients thereof are not appropriately set. For example, when the coil 2 has the DC resistance Zdc of 100 $\Omega$ (temperature coefficient 50 ppm/K), and the AC impedance Zac obtained by the above equation (3), wherein $Z0=800$ $\Omega$, $Z'=-8\Omega/deg$, $\beta0=346$ ppm/K, and $\beta'=-2.35$ ppm/K/deg, and a direct current Idc of 0.2 mA and an alternating current Iac of 1.0 mA (these temperature coefficients are zero) are supplied to the coil 2, FIG. 15 with plots corresponding to FIG. 8 is obtained. It shows that the $\Delta(dV1/dT)$ is larger than the $\Delta(dZac/dT)$. Thus, the $\Delta(dV1/dT)$ is not always reduced by simply supplying the direct current Idc.

In the displacement detector of this embodiment, the displacement direction of the core is provided by the curved line. However, the same effects can be obtained in the case of using the displacement detector that the displacement direction is provided by a straight line.

Second Embodiment

In the present embodiment, a first temperature compensation method is explained, by which the change in impedance Z of the coil 2 with respect to temperature is not influenced by the displacement of the core 1 relative to the coil 2, as an ideal condition that $\Delta(dZac/dT)$ becomes minimum. The configuration of the displacement detector of this embodiment is the same as that of the first embodiment. Therefore, the same components are designated by the same reference numerals and duplicate explanation is omitted.

As the first temperature compensation method, a method of matching a change ratio of the impedance Z with respect to temperature in the case of not inserting the core 1 in the coil 2 with the change ratio of the impedance Z with respect to temperature in the case of inserting the core 1 in the coil 2 is explained.

To control the impedance of the coil portion in the case of not inserting the core, thereby achieving that the change in impedance with respect to temperature is not changed by the relative displacement of the core to the coil, for example, it is preferred to determine each of the number of turns of the winding wire of the coil portion, winding pitch of the winding wire, and a frequency of the constant current input in the coil portion such that the temperature coefficient of the impedance of the coil portion is equal to the temperature coefficient of the impedance of the coil portion resulting from the relative displacement of the core to the coil portion.

Figure 17:
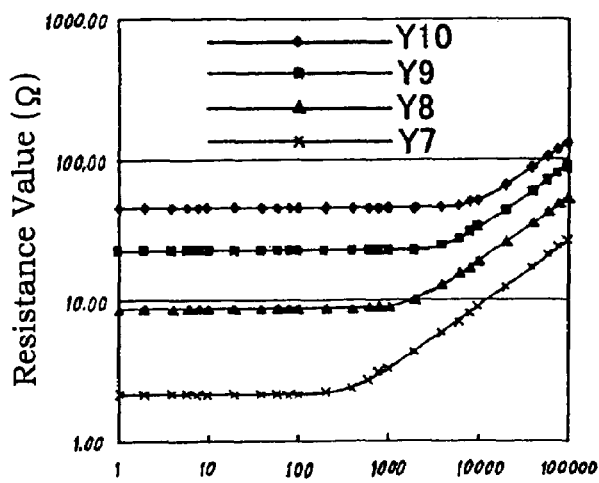
FIG. 17 is a graph showing a fluctuation of a resistance value of a copper wire caused by a skin effect.
Figure 16:
FIG. 16 is a diagram showing an equivalent circuit of a coil according to the second embodiment of the present invention.

As shown in FIG. 16, the impedance Z of the coil 2 is equivalent to a series circuit of a resistance component Rs and an inductance component Ls. The inductance component Ls has a skin effect component. When the skin thickness is sufficiently thin, and the frequency is constant, the skin effect is in proportion to the one-half power of volume resistivity $\rho$, and the temperature coefficient also receives the influence of the one-half power of volume resistivity $\rho$. FIG. 17 is a graph showing a fluctuation in resistance value of a copper wire brought by the skin effect, and provides a relationship between the frequency and the resistance value of the copper wire. The curves Y7, Y8, Y9, and Y10 respectively correspond to the wire diameters of 0.32 mm, 0.16 mm, 0.10 mm and 0.07 mm. By the influence of the skin effect, a degree of change in the resistance depends on the frequency and the wire diameter of the coil.

Figure 18:
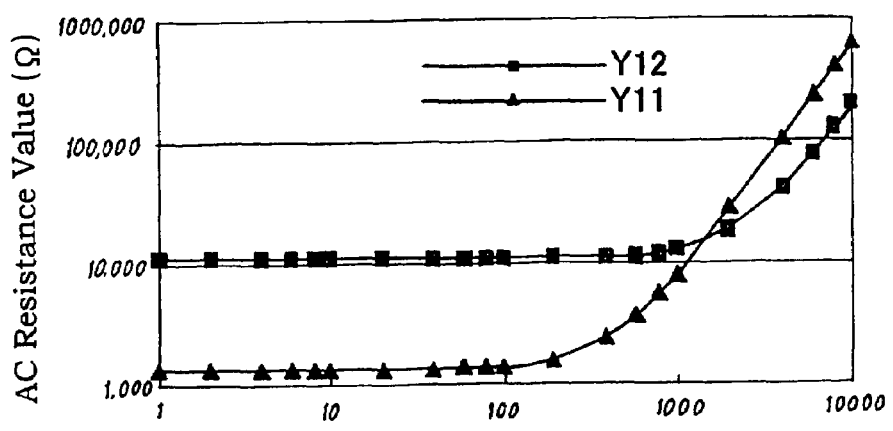
FIG. 18 is a graph showing a fluctuation of the resistance value of the copper wire caused by a proximity effect.

In addition, the temperature coefficient of the resistance component Rs largely depends on the temperature coefficient of volume resistivity $\rho$ of the winding material, and the resistance component Rs also receives the influence of a proximity effect. FIG. 18 is a graph showing a fluctuation in resistance value of the copper wire brought by the proximity effect. The curves Y1 and Y12 respectively correspond to combinations of the wire diameter and the number of turn, 0.16 mm, 40T and 0.07 mm, 60T. The proximity effect is a phenomenon that when the winding wire of the coil is wound at a narrow winding pitch, electric current does not uniformly flow in the winding wire. As the winding pitch is narrower, the influence increases. The influence also depends on the wire diameter. Since the proximity-effect component has a dependency on volume resistivity $\rho$ to the power of minus one, the temperature coefficient also receives the influence of the volume resistivity $\rho$ to the power of minus one.

That is, when the wire diameter is thick or the frequency is high, the temperature coefficient of the impedance Z at the time of not inserting the core 1 is reduced by the skin effect and the proximity effect. Therefore, the balance among the DC resistance component, the skin-effect component and the proximity-effect component under the displacement condition of not inserting the core 1 can be controlled to reduce the temperature coefficient of the impedance Z of the coil 2 by appropriately setting the volume resistivity $\rho$ of the winding wire, wire diameter, the number of turn, winding pitch and the frequency. Therefore, it is possible to solve a problem that the temperature coefficient changes in response to the displacement amount.

As the winding material, since copper has a very large temperature coefficient of the volume resistivity $\rho$, it is desired to select a material having a smaller temperature coefficient of the volume resistivity $\rho$ than copper. Specifically, nichrome, Manganin, or a copper-nickel alloy is preferably used as the winding material of the coil 2. In particular, it is preferred to use the copper-nickel alloy because the volume resistivity $\rho$ can be controlled by changing the compounding ratio of the alloy.

Next, a second temperature compensation method of matching a change ratio of the impedance Z with respect to temperature in the case of inserting the core 1 in the coil 2 with the change ratio of the impedance Z with respect to temperature in the case of not inserting the core 1 in the coil 2 is explained.

To control the impedance of the coil portion in the case of inserting the core, thereby achieving that the change in impedance Z with respect to temperature is not changed by the relative displacement of the core to the coil portion, for example, it is preferred to form the core by a material selected such that the temperature coefficient of the impedance of the coil portion is equal to the temperature coefficient of the impedance of the coil portion resulting from the relative displacement of the core to the coil portion. Alternatively, it is preferred to perform a surface treatment to the core such that the temperature coefficient of the impedance of the coil is equal to the temperature coefficient of the impedance of the coil portion resulting from the relative displacement of the core to the coil portion.

An increase in impedance Z of the coil 2 caused by inserting the core 1 depends on volume resistivity $\rho$ and magnetic permeability $\mu$ of the core 1. Therefore, since the temperature coefficient is also associated with the temperature coefficients of volume resistivity $\rho$ and magnetic permeability $\mu$ of the core 1, it is preferred to adequately select the core 1 having the volume resistivity $\rho$ and the magnetic permeability $\mu$ such that the temperature coefficient in the presence of the core 1 in the coil 2 matches with the temperature coefficient in the absence of the core 1 in the coil 2. Alternatively, a surface treatment may be performed such that the surface of the core 1 is of suitable volume resistivity $\rho$ and magnetic permeability $\mu$.

Generally, the ambient temperature, at which the displacement detector is used, is 120 to 130° C. at the highest. Curie Temperature of the core 1 is sufficiently higher than the ambient temperature. Although the magnetic permeability $\mu$ sharply reduces at the vicinity of Curie temperature, it seldom changes in the temperature range where the displacement detector is used.

Therefore, when forming at least a surface of the core 1 with a material having a small change in volume resistivity $\rho$ that is another factor affecting the increase in impedance Z of the coil 2, it is possible to reduce the temperature coefficient of the impedance Z, and thereby minimizing the fluctuation of the impedance Z of the coil 2 with respect to temperature.

For instance, in the displacement detector of the first embodiment for carrying out position detection according to the change in impedance of the coil 2, a primary component of this impedance is inductance. When a magnetic field developed in an axial direction of the coil 2 by flowing the constant current in the coil 2, a ring-like current (so-called eddy current) flows in the core 1 to cancel the magnetic field developed in the axial direction. This ring-like current has an action of lowering the inductance of the coil 2. The magnitude of the ring-like current depends on the volume resistivity of the core 1, as well as the magnitude and the frequency of the magnetic field applied (In the case of using a constant current and a fixed frequency, there is no fluctuation.). That is, as the volume resistivity of the core 1 increases, the ring-like current becomes smaller, so that the action of lowering the inductance reduces. Therefore, when the volume resistivity of the core 1 has a temperature characteristic, the inductance also has a temperature characteristic. Thus, the temperature characteristic of the inductance greatly affects the temperature characteristic of the impedance.

When the coil 2 is actually used as an impedance factor, it is often driven by the supply of an electric current with a frequency of several ten KHz to several hundred KHz. In this case, the magnetic field developed at the frequency by the coil 2 does not reach the interior of the coil 1, and gathers in the vicinity its surface.

Therefore, it is preferred that at least the surface of the core 1 is of one of a nickel-chromium alloy, nickel-chromium-iron alloy, iron-chromium-aluminum alloy, copper-nickel alloy and Manganin, each of which is a material having a small volume resistivity p. In this case, it is possible to reduce the fluctuation of impedance with respect to temperature of the coil under the condition that the core is inserted into coil. These materials are called as electric heating material. It has a small temperature coefficient of resistance. In addition, since iron or nickel is a magnetic material, their alloys often have magnetism. Therefore, the impedance change can be considerably reduced.

However, if the core 1 is configured in a bulk shape by the material having a small volume resistivity, a further improved temperature characteristic can be obtained. When using the electric heating material such as the nickel-chromium alloy, nickel-chromium-iron alloy, iron-chromium-aluminum alloy, copper-nickel alloy and Manganin, and forming the bulk shape of the core 1 by punching a flat sheet of those materials, the production cost becomes expensive due to the material loss. However, by cutting a marketed wire of the electric heating material, which is easy to get, to a required length, and then performing a bending process (or a drawing process), the core can be economically produced without the occurrence of useless industrial wastes.

A combination of the first and second temperature compensation methods may be adopted to effectively perform the temperature compensation.

Third Embodiment

Figure 19:
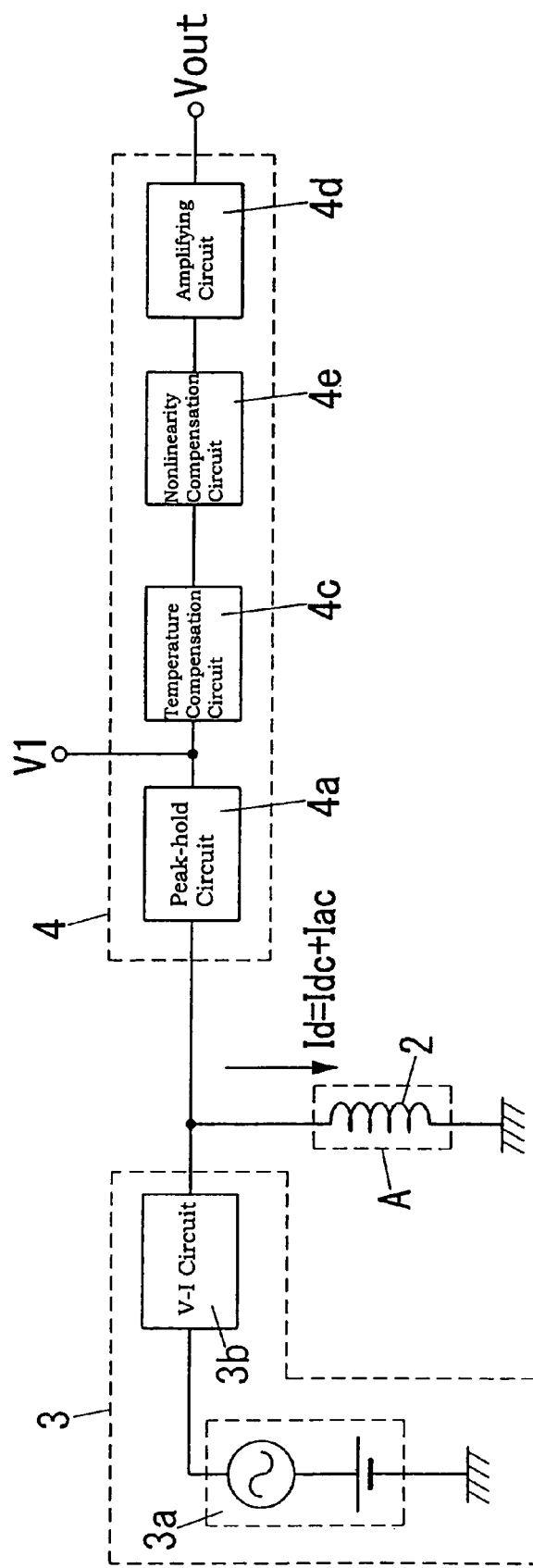
FIG. 19 is a circuit diagram of the displacement detector according to the first embodiment of the present invention.

The displacement detector of the first embodiment intends to minimize the fluctuation width (displacement dependency of temperature coefficient) of the temperature coefficient of the displacement signal Vout resulting from the relative displacement of the core 1 to the coil 2 according to the ratio between the AC voltage Vac and the DC voltage Vdc generated at both ends of the coil 2 when the direct current Idc and the alternating current Iac are supplied to the coil 2. In addition, as shown in FIG. 19, the signal processing circuit 4 is, for example, composed of the peak-hold circuit 4a, temperature compensation circuit 4c, nonlinearity compensation circuit 4e, and the amplifying circuit 4d. The peak-hold circuit 4a extracts the peak value V1 of the voltage Vs detected at the both ends of the coil 2. The temperature compensating circuit 4c performs a temperature compensation to the peak value V1 with the temperature coefficient having the reverse polarity against the temperature coefficient of the peak value V1. The nonlinearity compensation circuit 4e compensates the linearity to the relative displacement of the core 1 to the coil 2. The amplifying circuit 4d carries out a signal amplification to output the displacement signal Vout.

Figure 20:
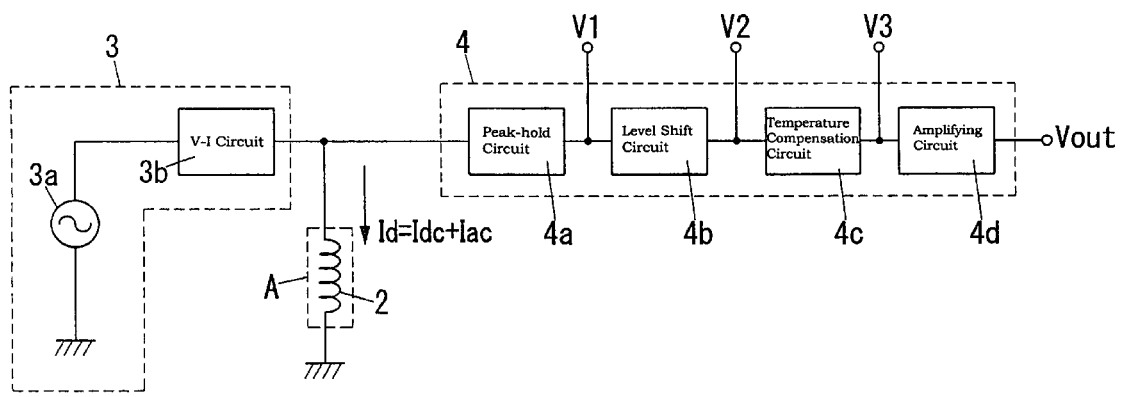
FIG. 20 is a circuit diagram of a displacement detector according to the third embodiment of the present invention.

On the contrary, in the displacement detector of this embodiment, as shown in FIG. 20, the signal processing circuit 4 is composed of the peak-hold circuit 4a, a level shift circuit 4b, the temperature compensating circuit 4c, and the amplifying circuit 4d. The peak-hold circuit 4a extracts the peak value V1 of the voltage Vs detected at the both ends of the coil 2. The level shift circuit 4b adds a level shift value Vsh to the peak value V1 to provide a signal V2. The temperature compensating circuit 4c performs a temperature compensation to the signal V2 with a temperature coefficient having the reverse polarity against the temperature coefficient of the signal V2 to provide a signal V3. The amplifying circuit 4d carries out an amplification of the signal V3 to output a displacement signal Vout.

To remove the influence of RF noises superimposed on the coil, it is preferred to dispose a low-pass filter at the input side of the signal processing circuit. Though the RF noises include harmonic components of a coil driving current and radiation noises from outside, it is effective to remove these influences.

As described above, the displacement detector of the present embodiment is characterized by extracting the characteristic value (V1) from the output voltage of the coil by the peak-hold circuit 4a, adding the level shift voltage (Vsh) to this characteristic value by the level shift circuit, so that a fluctuation width of temperature coefficient of a total of the characteristic value (V1) and the level shift voltage (Vsh) in the movable range of the core is smaller than the fluctuation width of temperature coefficient of the characteristic value (V1) in the movable range.

Thus, since the level shift value Vsh is added to the peak value V1 by the level shift circuit 4b, the direct current Idc supplied to the coil 2 may be zero or a small value. Therefore, it is effective when there is a limitation in electric current consumption (In FIG. 3, the direct current Idc=0). On the contrary, in the first embodiment, since a large value of Idc/Iac is needed to minimize the displacement dependency of the peak value V1, there is a fear of increasing the electric current consumption.

The peak value V1 is represented by the above equation (2), and on the other hand, the signal V2 is represented by the following equation:

$$V2=(Idc*Zdc+Vsh)+Iac*Zac \qquad (4)$$

wherein (Idc*Zdc+Vsh) corresponds to the DC voltage Vdc. An appropriate setting of the temperature coefficient or the magnitude (absolute value) of the level shift value Vsh is equivalent to the appropriate setting of the temperature coefficient or the ratio between the direct current Idc and the alternating current Iac, as in the case of the first embodiment. In addition, an appropriate setting of any one of the temperature coefficients and the values of the AC impedance Zac, DC resistance Zdc, alternating current Iac and the direct current Idc, other than the level shift value Vsh is equivalent to the appropriate setting of the temperature coefficient and the ratio between the DC voltage Vdc and the AC voltage Vac of the signal V2. Therefore, it is possible to minimize the fluctuation width of the temperature coefficient of the signal V2.

Figure 21:
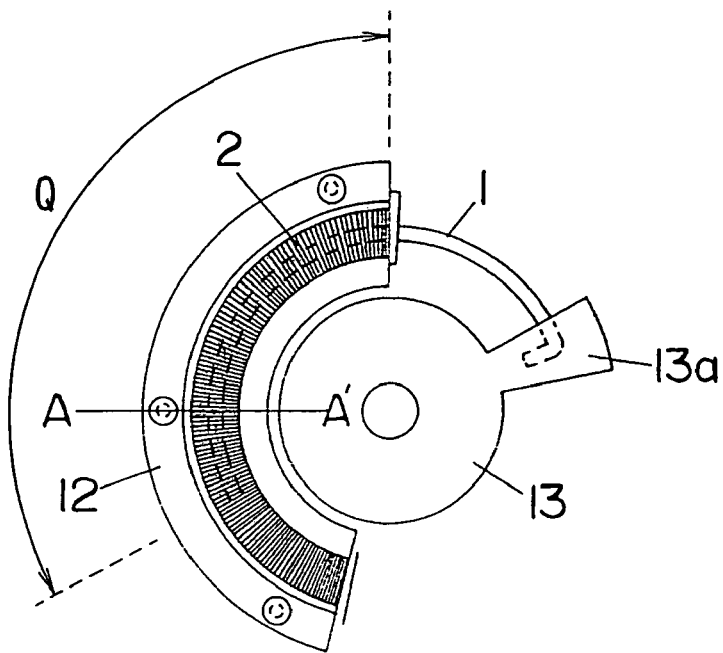
FIG. 21 is a top view of the displacement detector.
Figure 22:
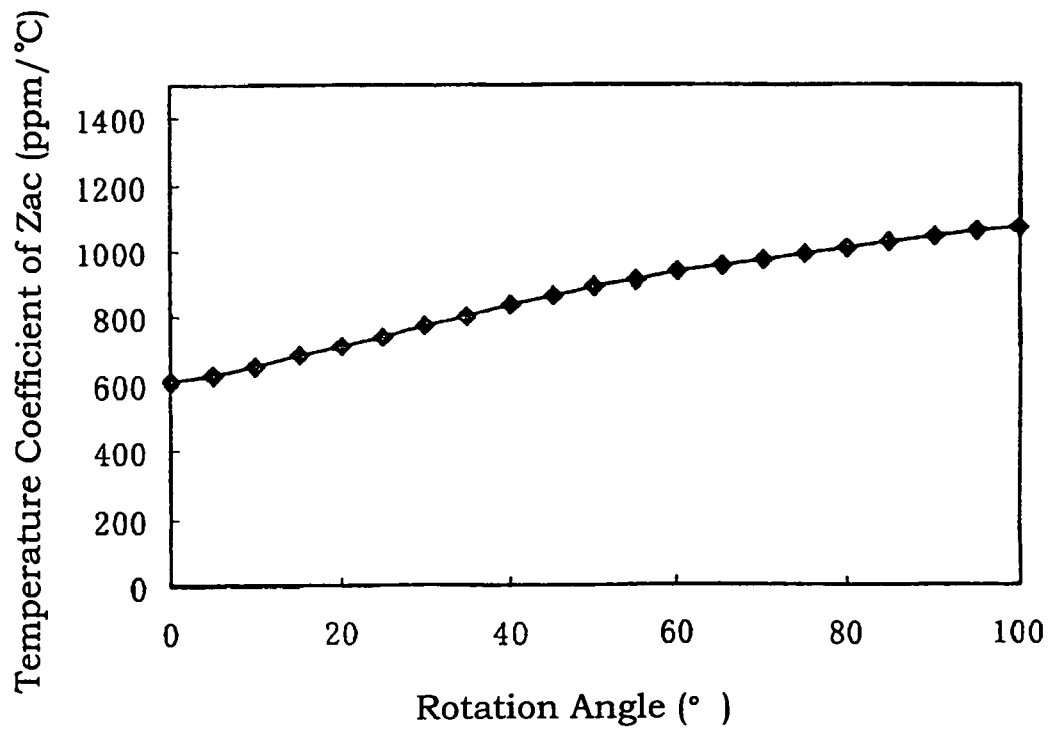
FIG. 22 is a graph showing a relation between AC impedance of a coil and rotation angle of a core of the displacement detector.

The displacement detector of this embodiment has the same configuration as that in the first embodiment. However, in the present embodiment, as shown in FIG. 21, as the rotation angle Θ of the movable block 13 changes from 0° toward 90°, an insertion amount of the core 1 into the coil 2 increases. FIG. 22 shows a temperature coefficient of the AC impedance Zac of the coil 2 relative to the rotation angle Θ. The AC impedance Zac has a displacement dependency. That is, as the rotation angle Θ is larger, the insertion amount of the core 1 into the coil 2 increases, so that the displacement dependency increases (In the range of the rotation angle Θ=0 to 100°, there is a difference of about 470 ppm/° C.). A measured frequency of the AC impedance Zac is 70 KHz. The DC resistance Zdc is 58 Ω (25° C.). The temperature coefficient of the DC resistance Zdc is 3900 ppm/° C.

Figure 23:
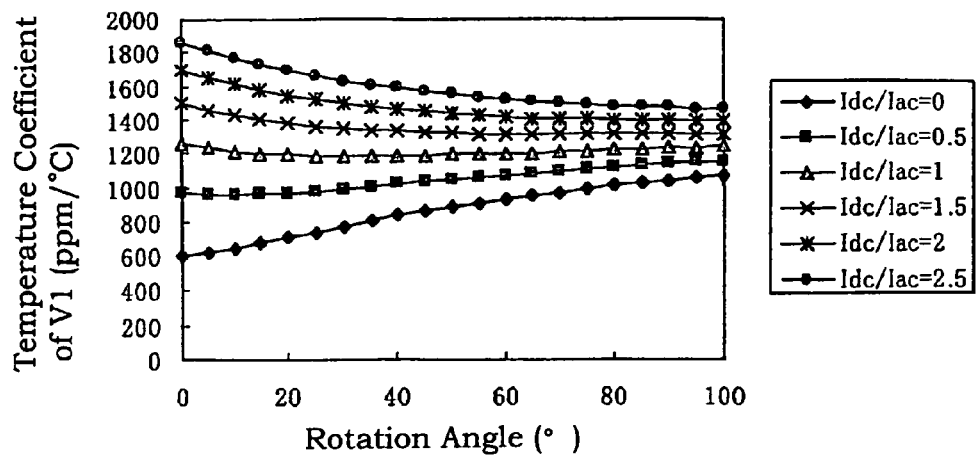
FIG. 23 is a graph showing a relation between temperature coefficient of an output voltage of the coil and rotation angle of the core of the displacement detector of FIG. 19.

FIG. 23 shows a temperature coefficient of the peak value V1 extracted under the device configuration of FIG. 19. By changing the value of Idc/Iac under a condition of the alternating current Iac=1 mA, it is possible to control the displacement dependency of the temperature coefficient of the peak value V1. When the value of Idc/Iac is in the vicinity of 1.0, the displacement dependency of the temperature coefficient of the peak value V1 can be minimized. For simplicity, it is assumed in this case that there is no change in frequency, the alternative current Iac, and the direct current Idc with respect to temperature (and so forth).

Figure 24:
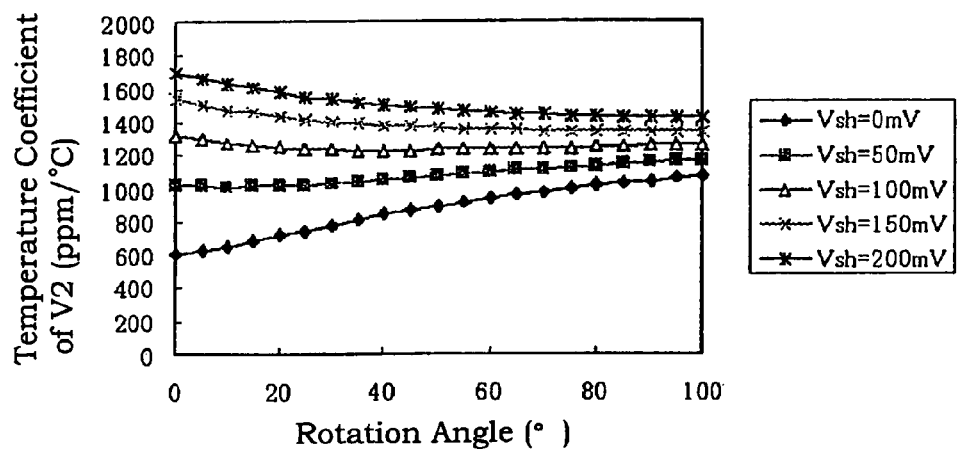
FIG. 24 is a graph showing a relation between temperature coefficient of an output signal of a peak-hold circuit and rotation angle of the core of the displacement detector of FIG. 20.

On the other hand, FIG. 24 shows a temperature coefficient of the signal V2 under the condition of changing the level shift value Vsh from 0 mV to 200 mV by use of the device configuration of FIG. 20. The direct current Idc is zero, and the temperature coefficient h of the level shift value Vsh is 3000 ppm/° C. In this case, it is possible to control the displacement dependency of the temperature coefficient of the signal V2 by changing the level shift value Vsh. When the value Vsh is in the vicinity of 100 mV, the displacement dependency of the temperature coefficient of the signal V2 can be minimized. As a result, the same effects as the case of FIG. 19 can be obtained.

Figure 25:
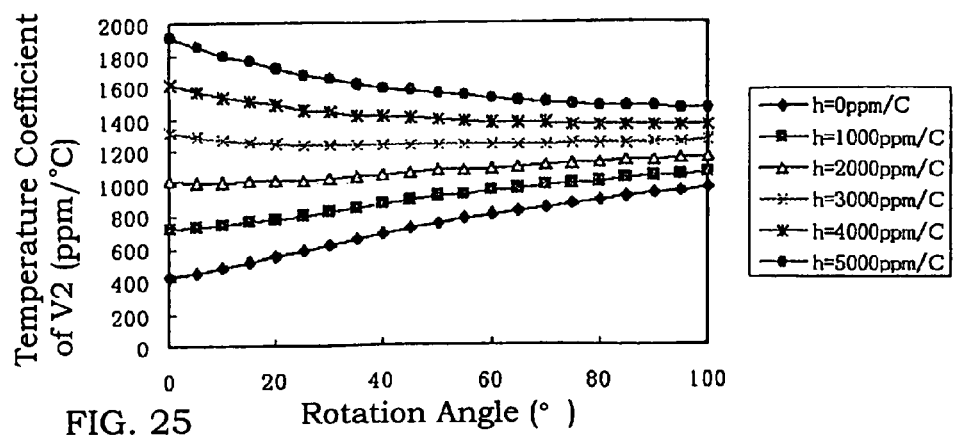
FIG. 25 is a graph showing a relation between temperature coefficient of the output signal of the peak-hold circuit and rotation angle of the core of the displacement detector of FIG. 20.

In addition, FIG. 25 is a temperature coefficient of the signal V2 under the condition of changing the temperature coefficient h of the level shift value Vsh from 0 ppm/° C. to 5000 ppm/° C. by use of the device configuration of FIG. 20. The direct current Idc is zero, and the level shift value Vsh is 100 mV. In this case, it is possible to control the displacement dependency of the temperature coefficient of the signal V2 by changing the temperature coefficient h. When the temperature coefficient h is in the vicinity of 2000 ppm/° C., the displacement dependency of the temperature coefficient of the signal V2 can be minimized. As a result, the same effects as the case of FIG. 19 can be obtained.

To the thus obtained signal V2, a temperature compensation having no displacement dependency is performed by the temperature compensation circuit 4c (for example, it is approximately −1200 ppm/° C. in FIG. 23, approximately −1450 ppm/° C. in FIG. 24, and approximately −1300 ppm/° C. in FIG. 25), thereby obtaining the signal V3 that do not depend on the ambient temperature, and is substantially equal to the signal V2 for the displacement at room temperature. Then, a required amplification is performed to the signal V3 by the amplifying circuit 4d to output the displacement signal Vout (when the amplification is not needed, the signal V3 is output as the displacement signal Vout). As the temperature compensation circuit 4c, it is not limited to perform a primary compensation to temperature. For example, it may be provided by a circuit for performing a secondary compensation or another compensation represented by a nonlinear equation. Similarly, the amplifying circuit 4d may be provided by a circuit with an amplification degree represented by a nonlinear equation for the signal V3.

Figure 26:
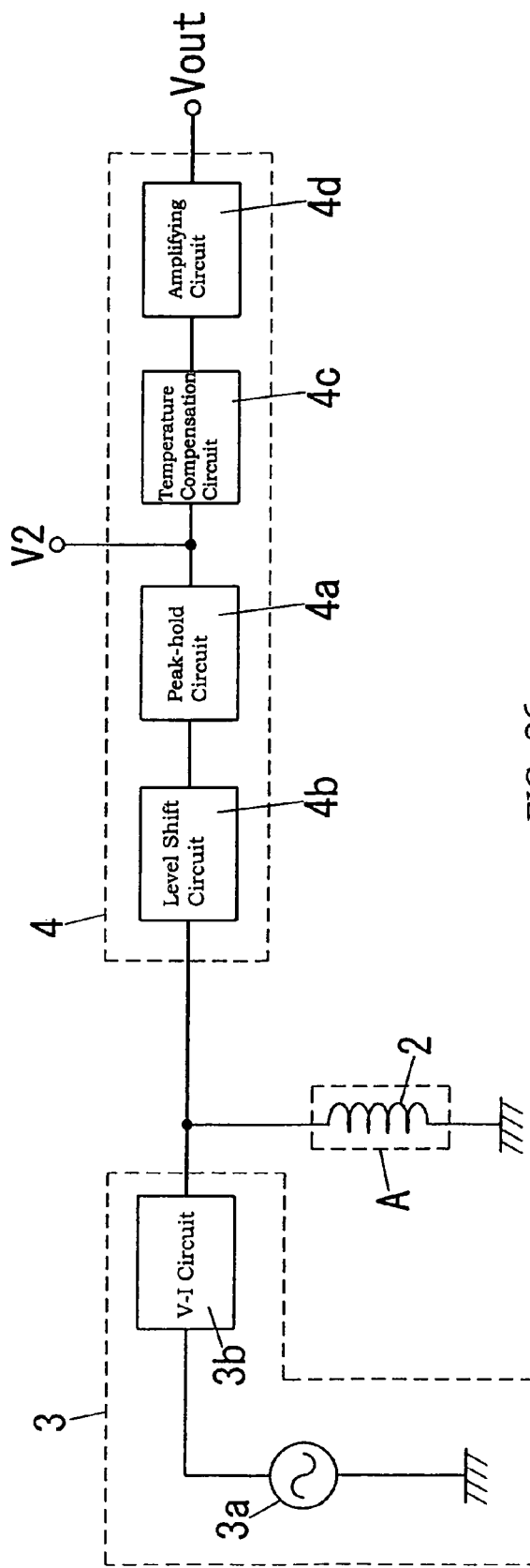
FIG. 26 is another circuit diagram of the displacement detector.

As shown in FIG. 26, even when the level shift circuit 4b is connected between the coil 2 and the peak-hold circuit 4a, the signal V2 is represented by the equation (4). Therefore, the same effects can be obtained.

In the present embodiment, when circuit constants or coefficients for the amplification, the temperature coefficient of the temperature compensation, in addition to the level shift value Vsh and the temperature coefficient h of the level shift value Vsh can be stored in, for example, an EEPROM, and they can be set appropriate values to individual products, it is possible to minimize characteristic fluctuations resulting from a temperature change without being affected by an individual difference of the coil 2 or the signal processing circuit 4.

Next, calibrations of the level shift value Vsh and its temperature coefficient are explained below, which are individually performed at the time of manufacturing the displacement detector.

As shown in FIG. 24, to minimize the displacement dependency of the temperature characteristic, by controlling the level shift value Vsh, the temperature characteristics of the peak value V1 and the signal V2 for each of displacements (rotations) under a temperature cycle are measured to determine an optimum level shift value Vsh, and then a coefficient (circuit constant) of the amplifying circuit 4d is determined according to the level shift value Vsh. Thus, since the displacement signal Vout is obtained after the setting of the coefficient of the amplifying circuit 4d, it is needed to perform the temperature cycle again to check the temperature characteristic of the displacement signal Vout.

On the other hand, as shown in FIG. 25, to minimize the displacement dependency of the temperature characteristic by controlling the temperature coefficient h of the level shift value Vsh, the coefficient of the amplifying circuit 4d can be firstly determined at room temperature (the gain of the temperature compensation circuit 4c is 1). Then, an optimum temperature coefficient h or the temperature coefficient of the temperature compensation circuit 4c is determined by measuring the temperature characteristics of the peak value V1 and the signal V2 for each of the displacements (rotations) under the temperature cycle. In this case, since the displacement signal Vout can be checked under this temperature cycle, it is not needed to repeat the temperature cycle. Thus, the calibration can be more simply performed by controlling the temperature coefficient h of the level shift value Vsh in comparison with the case of controlling the level shift value Vsh.

As in the case of the first embodiment, when the bias current is supplied to the coil 2, the calibration can be more simply performed by controlling the temperature coefficient of the frequency, alternating current Iac, or the direct current Idc, as compared with the case of controlling the value of Idc/Iac, as shown in FIG. 23.

In the above explanation, a signal processing of the peak value V1 of the voltage detected at both ends of the coil 2 as the original signal is performed. Alternatively, a signal processing of a bottom voltage of the voltage detected at both ends of the coil 2 as the original signal may be performed. In this case, the following equations are used in place of the equations (2) and (4).

$$V1 = Vdc + Vac = Idc*Zdc - Iac*Zac \quad (5)$$

$$V2 = (Idc*Zdc + Vsh) - Iac*Zac \quad (6)$$

In this case, by appropriately setting the temperature coefficient h of the level shift value Vsh and the level shift value Vsh (at least one of them is set to a negative value), the same effects as the above can be obtained. Alternatively, by using an effective value or a peak-to-peak voltage of the voltage detected at both ends of the coil 2 as the original signal, and performing a level shift to the original signal, the same effects as the above can be obtained.

Thus, according to the second embodiment, it is not needed to use the temperature coefficient of the DC resistance Zdc of the coil 2. Therefore, it is enough to extract only the AC voltage Vac from the voltage detected at both ends of the coil 2, and give a DC voltage (level shift value Vsh) by the level shift circuit 4b. This provides a greater degree of freedom of circuit design.

Fourth Embodiment

Figure 27:
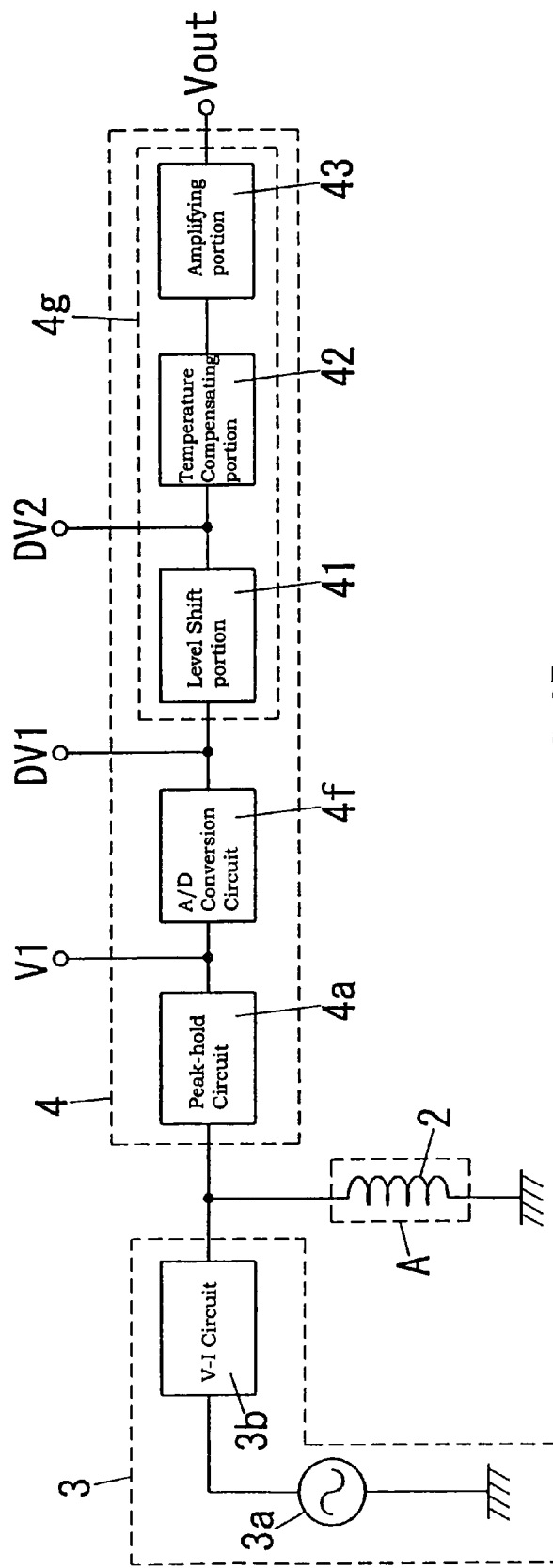
FIG. 27 is a circuit diagram of a displacement detector according to the fourth embodiment of the present invention.

A displacement detector of the present embodiment comprises, as shown in FIG. 27, an A/D conversion circuit 4f connected to a peak-hold circuit 4a, and a digital operation block 4g connected to the A/D conversion circuit 4f and composed of a level shift portion 41, temperature compensating portion 42 and an amplifying portion 43. A peak value V1 of the voltage detected at both ends of the coil 2 is converted into a digital signal DV1 by the A/D conversion circuit 4f. Then, as an digital signal operation performed in the digital operation block 4g, a required digital quantity is added by the level shift portion 41 to obtain a level shifted digital signal DV2. In the temperature compensating portion 42, an operation for carrying out a temperature compensation is performed to the digital signal DV2. In addition, the amplifying portion 43 amplifies a digital output signal of the temperature compensating portion 42 to output the displacement signal Vout that is a digital signal.

Thus, when the signal is digitalized, the coefficient for amplifying, temperature coefficient for the temperature compensation, temperature coefficient and digital quantity for the level shift can be determined from calculations by measuring only temperature characteristic of the peak value V1 in one temperature cycle. In addition, there is an advantage that the temperature characteristic of the output displacement signal Vout can be checked by calculation (an error between the actual output and the calculated output is smaller than quantization error). Moreover, it is possible to obtain an analog signal output by D/A converting the digital operation result.

Fifth Embodiment

In this embodiment, a method of improving the linearity of output is explained. The configuration of the displacement detector of the present embodiment is substantially the same as that in any one of the first to fourth embodiments. Therefore, the same components are designated by the same reference numerals and the duplicate explanation is omitted.

As a first method of improving the linearity of output, an appropriate material for the core 1 is selected, and a frequency f of the alternating current Iac is appropriately determined. The inventors of this invention carried out experiments concerning the linearity of AC impedance Zac by changing the material of the coil 2 introduced in the first embodiment. FIG. 28 is a list of metal materials used of soft magnetic iron, Permalloy, electromagnetic stainless steel, SUS430, iron chrome, and corresponding estimated characteristics, i.e., resistivity. In FIG. 28, "electromagnetic stainless steel" is a metal containing Si, Mn, P, Ni and Ti in addition to 11% of Cr, and used for electromagnetic valves and relay yokes. To allow each of the metal materials to exhibit the magnetic characteristic, a heat treatment was performed under a condition peculiar to the respective metal material. Shapes of the metal materials are identical to each other.

FIGS. 29A to 29E show experimental results of the linearity of AC impedance Zac of the metal materials in each of frequencies f, 10 KHz, 30 KHz, 50 KHz, 70KHz and 90 KHz of the alternating current Iac. From these results, it can be understood that the magnetic stainless steel (electromagnetic stainless steel) exhibits good linearity in comparison with the soft magnetic iron and pure iron. In particular, since SUS430 (18Cr ferritic stainless steel) is inexpensive and exhibits corrosive resistance as well as good linearity to both of the angle span and the frequency, it is preferably used as the core material of the displacement detector. It is conceived that these linearities are determined by the balance between resistivity and magnetic permeability and the frequency characteristic. For example, since iron chrome has a desirable linearity when the frequency is larger than 50 KHz, it becomes an appropriate core material having an advantage of a change ratio of resistivity with respect to temperature by performing a countermeasure to corrosion resistance.

As a second improving method, countermeasures for minimizing the "end effect" indicated as the problem in the conventional art are performed. For example, it is preferred that magnetic flux easily passes through a portion extending over a required length from an end of the core than the remaining portion, or the portion extending over the required length from the core end has a larger diameter than the remaining portion. Alternatively, the portion extending over the required length from the core end may be made of a material having a higher magnetic permeability than the remaining portion. In these cases, the "end effect" is reduced, so that the linearity of output can be maintained over a wider zone.

FIGS. 30A and 30B show that a contribution of a lead end part 1a or 1b of the core 1 to the AC impedance Zac is increased by appropriately determining the shape of the core 1. In FIG. 30, the lead end part 1a of the core 1 is formed in a rectangular shape to be thicker than the remaining portion of the core 1. In FIG. 30B, the lead end portion 1b of the core 1 has a wedge shape formed to be thicker than the remaining portion of the core 1. In both cases, since the lead end portion (1a or 1b) is thicker than the remaining portion of the core, it is possible to increase an amount of interlinkage magnetic flux among the pitches of the wound wire, thereby further contributing to an increase in inductance. In addition, when the core 1 is formed by etching or metal injection molding, an increase in production cost can be prevented.

FIG. 30C shows that the amount interlinkage magnetic flux at a lead end part 1C of the core 1 can be increased by forming the lead end part IC with a material having a higher magnetic permeability than the core main body, thereby contributing to the increase in inductance. In the cases of FIGS. 30A and 30B where the remaining part must be thinner than the lead end part, a decrease in sensitivity may occur. However, in the case of FIG. 30C, such a decrease in sensitivity does not occur. In addition, since the core has a constant thickness, it becomes mechanically stable, and can be readily formed by a combination of two parts.

In addition, it is also preferred to perform a surface treatment to the portion extending over the required length from the core end with the material having a higher magnetic permeability than the remaining portion, or form a surface of the portion extending over the required length from the core end with a Permalloy-plated electromagnetic stainless steel. In addition, chamfering may be performed to edges of the core end.

FIG. 30D shows a case that a lead end part Id of the core is surface-treated (plated) with the material having a high magnetic permeability. This further improves the case of FIG. 30C in the aspects of reducing time and labor for production and facilitating positioning. In addition, since the core thickness can be kept constant, the core becomes mechanically stable, and a curved coil can be readily formed. In place of plating, for example, a foil material having the high magnetic permeability may be adhered.

A displacement detector shown in FIG. 31 comprises a coil 2 produced by winding a wire on a hollow bobbin 15, and a core 1 extending in the winding direction X of the coil 2 to such that the core 1 can be inserted in the hollow portion of the bobbin 15. A constant-current circuit and a signal processing circuit (not shown) are formed in a same manner as any one of the first to fourth embodiments. In this embodiment, the core 1 is configured in a conventional shape, and the winding wire is wound such that the coil end portions are thicker (namely, the number of winding layers is greater) than the remaining portion. Therefore, even when only the lead end part of the core 1 is inserted, the magnetic flux developed by the greater number of winding layers can be interlinked to increase the inductance.

In addition, to prevent the occurrence of an accidental friction between the core 1 and an inner surface of the bobbin of the coil 2, it is preferred to perform chamfering to the lead end part of the core 1, or a round-off treatment for removing edges, as shown in FIGS. 32A to 32E. In these cases, a deterioration of the linearity can be prevented without such a friction. In FIGS. 32A to 32E, the chamfering or the round-off treatment is performed to the lead end parts of the cores 1 shown in FIGS. 30A to 30D.

In FIG. 4 showing the cross sections of the core 1 and the coil 2, a coating 11 of a nonmagnetic material such as copper is formed on the inner surface of the curved bobbin 10, in which the core 1 can be inserted, to prevent the friction between the core 1 and the coil 2. In the case of using a metal material or a conductive material as the coating 11, it is needed that the material does not form a closed loop in the cross section. In place of the metal deposition, a part of the side surface in the through hole of the bobbin may be formed by a sheet metal member. Alternatively, a material having sidability and wear resistance such as fluorine coating may be used to obtain the same effects. In these cases, since a foil or a linear member (particularly, amorphous) is used for the core 1, and the core is slidable along the side surface in the through hole of the curved bobbin 10, there are effects of thinning the displacement detector or reducing the diameter as well as improving the linearity of output.

In the case of using a Permalloy-plated electromagnetic stainless steel, there are effects that the a well-balanced magnetic permeability between the core end and the remaining portion and excellent corrosion resistance are obtained. Moreover, when the coil 2 is formed by a spring coil to be inserted in the curved bobbin 10, it is possible to readily obtain a uniform winding pitch.

In addition, as shown in FIG. 2, the housing has a curvature correcting member 12 for restoring a reduced curvature of the curved bobbin deformed by a winding tension of the coil 2 into its original state. The curvature correcting member 12 is formed with a groove having substantially the same curvature as the coil 2. When the coil 2 is inserted into the groove of the curvature correcting member 12, the curvature correcting member 12 makes contact with an inside radius portion and a bottom side of the coil 2 to correct the reduction in curvature of the curved bobbin 10. The curvature correcting member 12 may correct the change in curvature of the coil by making contact with at least a part of the inside radius portion of the coil 2. In FIG. 2, the curvature correcting member 12 is separately formed from the housing 14. Alternatively, a similar groove may be formed in the housing 14 itself.

The formation of such a curvature correcting member 12 presents another advantage described below. That is, in the coil 2 not having such a structure, it is needed that retaining/fixing members 16 are provided outside in the vicinity of a flange and at the opposite ends of the coil 2, as shown in FIG. 33. In the presence of the retaining/fixing members, a stroke (mechanical displacement amount) of the core 2 is restricted. However, in the case of FIG. 2 that the retaining/fixing member is not formed, a prolonged stroke of the core 1 is available. Alternatively, in place of the prolonged stroke, an angle range of the winding portion of the curved bobbin 10 may be extended to improve the linearity of output.

Sixth Embodiment

Figure 44:
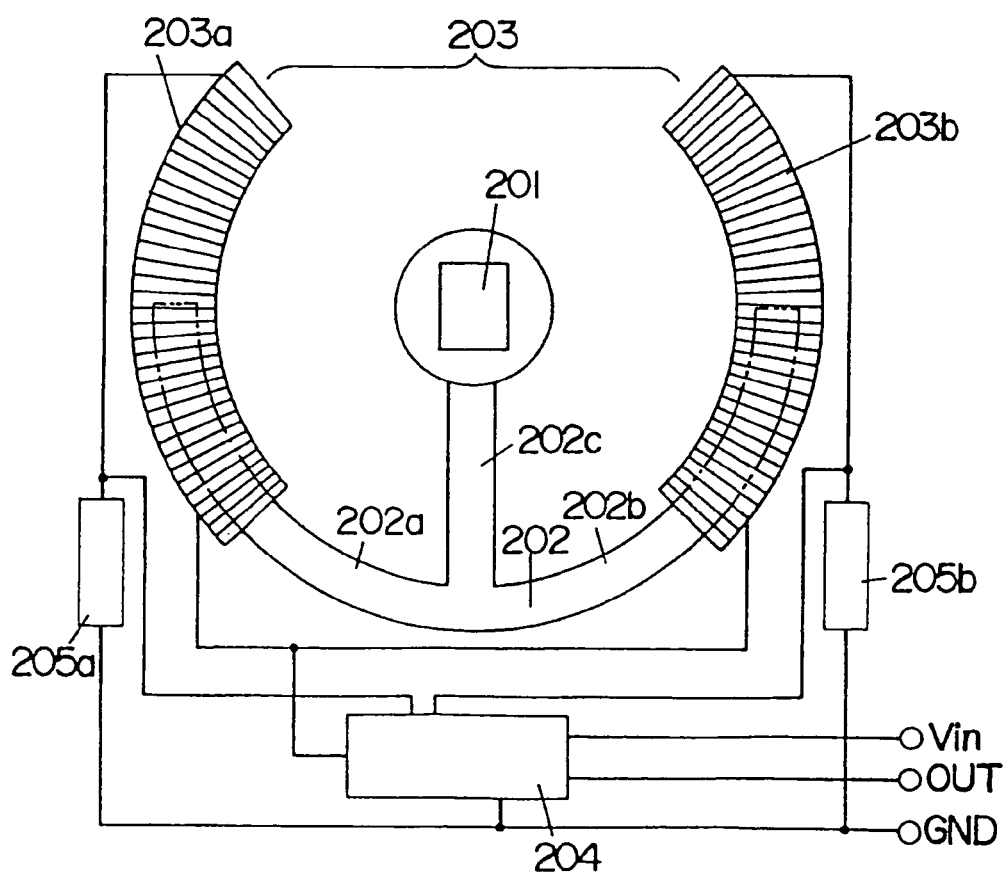
FIG. 44 is a schematic diagram of another conventional displacement detector.

A displacement detector of the present embodiment shown in FIGS. 34 to 37 is formed according to an idea of a failsafe system and in consideration of its use in automobiles (e.g., a position sensor for detecting the position of an acceleration pedal). In this view, the displacement detector has a structure obtained by doubling the coil portion of the displacement detector shown in FIG. 2 or 3. In FIGS. 34 and 35, the displacement detector comprises a pair of coils 2a, 2b curved at the same curvature, and a pair of core 1a, 1b curved at the same curvature such that each of the cores can be inserted in the corresponding coil (2a, 2b) by rotating a movable block 13 about a rotation axis. These two coils 1a, 1b are laid one over the other in the direction of the rotation axis. In comparison with the case of FIG. 44 where two coils are displaced on the same plane, it is possible to increase the opening angle of the winding portion of the coils 2a, 2b, and a mechanical rotation angle of the movable block 13. As a result, it is possible to provide a wide range of the rotation angle $\Theta$, in which the linearity of impedance Z of each of the coils 2a, 2b is good. Moreover, since these coils 2a, 2b can be formed to have the same characteristic, there are advantages in easiness of wire winding and cost performance.

A displacement detector shown in FIGS. 36 and 37 comprises a coil 2a curved at a small curvature, coil 2b curved at a large curvature, and a pair of cores 1a, 1b curved at small and large curvatures such that each of the cores can be inserted in the corresponding coil (2a, 2b) by rotating a movable block 13 about a rotation axis. The cores 2a, 2b are disposed on the same plane to extend over the same range of the rotation angle $\Theta$ with respect to the rotation axis of the cores 1a, 1b and. Therefore, as in the case of the displacement detector shown in FIGS. 34 and 35, it is possible to increase the opening angle of the winding portion of the coils 2a, 2b, and the mechanical rotation angle of the movable block 13. As a result, a wide range of the rotation angle $\Theta$ is obtained, in which the linearity of impedance Z of each of the coils 2a, 2b is good. Moreover, there is another advantage of thinning the displacement detector.

By integrally molding the coils 2a, 2b wound on the curved bobbins 10a, 10b with a resin material 17, it is possible to prevent disconnection of the wire at the time of assembling, or receiving vibration/impact. In addition, since there is no displacement in positional relation between the coils 2a, 2b at the time of assembling, it is possible to minimize variations in output between two detecting sections. Moreover, positioning of these two coil portions integrally molded and the movable block 13 becomes easy, and the time required for assembling is shortened. By performing the resin molding under a condition that there is no deformation of the curved bobbins 10a, 10b, the formation of a specific member for correcting the deformations of the curved bobbins can be omitted. Furthermore, the cores 1a, 1b may be integrally molded with the resin material to be inserted in the coils. There are advantages that positioning is enhanced at the time of assembling and variations in output between the two coil portions can be prevented.

Seventh Embodiment

The configuration of a displacement detector of the present embodiment is substantially the same as that in any one of the first to sixth embodiments. Therefore, the same components are designated by the same reference numerals and the duplicate explanation is omitted.

In the present embodiment, the displacement signal Vout output from the signal processing circuit 4 is explained. When a system (EUC) of processing a signal output from the signal processing circuit is a digital circuit, and the displacement signal Vout is an analog signal, an error and a response delay may be caused by repeating redundant A/D conversion or D/A conversion. However, when the displacement signal Vout is a digital signal, these problems do not occur. In addition, it is possible to reduce the influence of external noises on the signal transmission. Therefore, in the present embodiment, the displacement signal output from the signal processing circuit 4 is the digital signal. The signal processing circuit 4 has a signal correcting circuit composed of an A/D conversion circuit for converting the peak value V1 of the output voltage of the coil portion A into the digital signal, and a correcting circuit for performing digital trimming to the digital signal.

It is preferred that the displacement signal output from the signal processing circuit is composed of an output initiate signal, and one of a pulse signal provided after the elapse of a duration depending on position data from the output of the output initiate signal, pulse signal having a duty ratio that depends on the position data provided in succession to the output initiate signal, pulse signal having a pulse width that depends on the position data provided in succession to the output initiate signal, and a pulse signal(s), the number of which depends on the position data provided in succession to the output initiate signal.

FIGS. 38A and 38B show a first example of the displacement signal Vout provided from the signal processing circuit 4. The displacement signal Vout is composed of an output initiate signal having a width Ti corresponding to three pulse widths of a reference pulse Vr, and a pulse signal provided after the elapse of a duration T2 from the output of the output initiate signal. At the ECU side, by measuring the pulse width Ti of the output initiate signal and the duration T2 with a timer, a relative position of the core 1 to the coil 2 can be determined.

FIGS. 39A and 39B show a second example of the displacement signal Vout provided from the signal processing circuit 4. The displacement signal Vout is composed of an output initiate signal having a width corresponding to three pulse widths of the reference pulse Vr, and pulse signals, the number of which depends on the position data provided in succession to the output initiate signal. At the ECU side, by counting the number of the pulse signals with a counter, a relative position of the core 1 to the coil 2 can be determined. FIGS. 40A and 40B show a third example of the displacement signal Vout provided from the signal processing circuit 4. The displacement signal Vout is composed of a pulse signal having a duty ratio depending on the position data. ON/OFF times of the duty ratio are respectively determined according to the number of pulses of the reference pulse Vr. At the ECU side, by measuring the period and the pulse width with a timer, a relative position of the core 1 to the coil 2 can be determined.

Securing a required bit number of digital output leads to an increase in the number of wirings between the displacement detector and the ECU. However, according to above configurations, only one signal line is needed. The displacement signal Vout may be composed of a pulse signal having a pulse width that depends on the position data. If there is no limitation in the number of signal lines, the displacement signal Vout may be composed of a digital signal with a bit number satisfying a resolution needed for position detection. In this case, it is possible to perform reading in a real-time manner by the ECU, thereby facilitating the processing.

Eighth Embodiment

Figure 41:
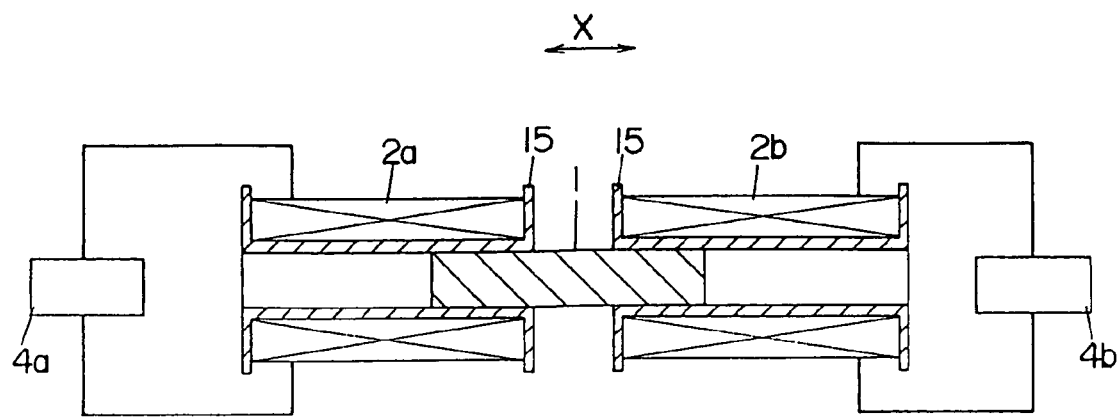
FIG. 41 is a cross-sectional view of a displacement detector according to the eighth embodiment of the present invention.
Figure 42:
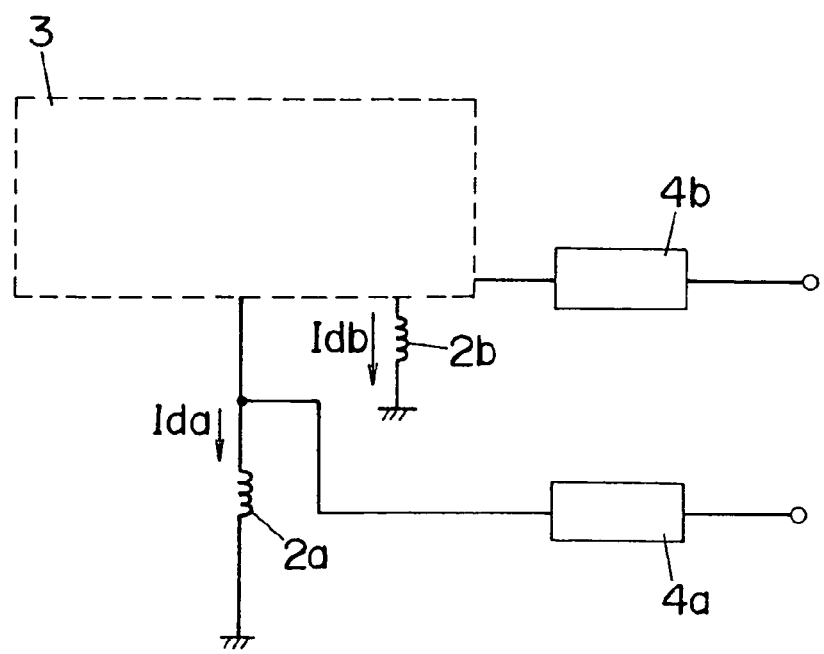
FIG. 42 is a circuit diagram of the displacement detector of FIG. 41.
Figure 43:
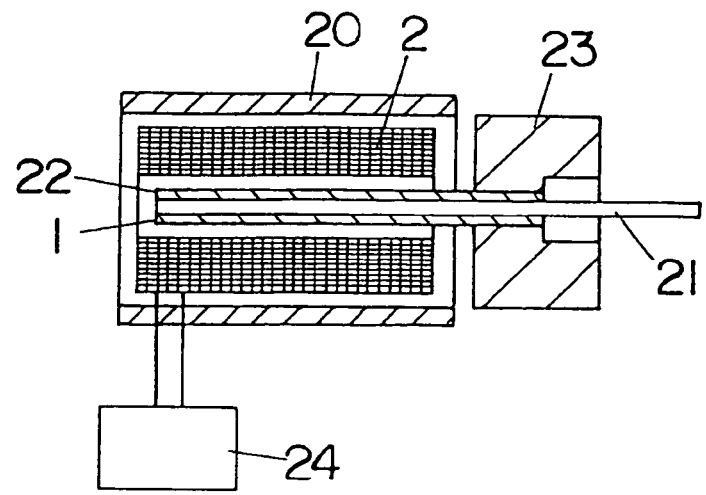
FIG. 43 is a cross-sectional view of a conventional displacement detector.

A cross-sectional structure and a circuit configuration of a displacement detector of the present embodiment are shown in FIGS. 41 and 42, respectively. The configuration of each of signal processing circuits 4a, 4b is the same as that in any one of the first, third and fourth embodiments.

The displacement detector of this embodiment has a double-layered structure of sensor coil portions according to the failsafe system and in consideration of its use in automobiles. The displacement detector comprises a pair of coils 2a, 2b each obtained by winding a wire on a hollow bobbin 15 and disposed to be opposed to each other in the winding-axis direction, core 1 that can be inserted in hollow portions of the bobbins 15 and displaced in the winding-axis direction X of the coils 2a, 2b, constant-current circuit 3 for respectively outputting constant currents Ida, Idb to the coils 2a, 2b, signal processing circuit 4a for converting a peak value of a voltage detected at both ends of the coil 2a determined by the constant current Ida provided from the constant-current circuit 3 and impedance Za of the coil 2a into a displacement signal indicative of position data between the core 1 and the coil 2a, and a signal processing circuit 4b for converting a peak value of a voltage detected at both ends of the coil 2b determined by the constant current Idb provided from the constant-current circuit 3 and impedance Zb of the coil 2b into a displacement signal indicative of position data between the core 1 and the coil 2b.

In the present embodiment, the two coils 2a, 2b commonly use the core 1, which is attached to a structural member (not shown). In addition, the same constant-current circuit 3 respectively provides the constant currents Ida, Idb each having a required frequency and a required amplitude to the coils 2a, 2b. Therefore, it is possible to reduce an increase in cost caused by the formation of the double-layered structure of the coil portions.

In addition, an integrated circuit (IC) section is the most expensive part. Therefore, when active circuit sections of the constant-current circuit 3 and the signal processing circuits 4a, 4b are composed of a monolithic integrated circuit, it is possible to further reduce the increase in cost caused by the formation of the double-layered structure of the coil portions.

Hereinafter, explained are some of examples as to how to specifically use the displacement detector according to the first to eighth embodiments. First, in the case of using the detector as a position sensor for detecting the position of an acceleration pedal in automobiles, curved bobbins having the same curvature can be arranged on the same plane because the detection angle is relatively narrow, i.e., about 30°. Therefore, impedances of the coils are in a complementary relation. In addition, since the detector is disposed in a driver room of the automobile, an upper limit of the operation temperature of the detector is not so high. Furthermore, since there is a sufficiently large stroke with respect to the detection angle, an intermediate portion of the stroke having good linearity of output can be used without largely modifying the material and the shape of the core.

Next, in the case of using the detector as a throttle position sensor, a large detection angle of about 90° or more, and a large mechanical stroke are needed. For this viewpoint, it is preferred to use the double-layered structure of the curved bobbins shown in FIGS. 34 and 35, or the structure characterized by the curved bobbins having different curvatures and arranged on the same plane so as to have the same range of rotation angle, as shown in FIGS. 36 and 37. In addition, since there is a limitation in the mechanical stroke with respect to the detection angle, it is desirable to select a core material such as SUS 430, by which the linearity of the coil impedance can be easily obtained. Furthermore, since the throttle position sensor is disposed in an engine room of the automobile, the detector is required to have a higher upper limit of the operation temperature. Therefore, it is desirable to select the core material, by which the linearity can be easily obtained, and provide an appropriate bias current to the coil, thereby minimizing the influence of a change in angle on temperature characteristic (temperature coefficient).

In addition, in the case of using the detector as a position sensor for a plant such as power generation facilities, the detector is often subjected to a high temperature. Therefore, it is desirable to use iron chrome as the core material, and provide an appropriate bias current to the coil, thereby minimizing the influence of a change in angle on temperature characteristic (temperature coefficient).

Additionally, in the case of using the detector as a position sensor for angle detection in motorized bicycles, only one coil portion is often used in the aspect of cost performance. On the other hand, in the case of using the detector as the position sensor for angle detection in automobiles, the double-layered structure of the coil portions is preferable to secure the reliability of the system.

INDUSTRIAL APPLICABILITY

As described above, according to the displacement detector of the present invention, a change in temperature coefficient of the impedance of the coil portion to a displacement of the core can be compensated by using a relatively simple circuit configuration. In particular, when the constant-current circuit is composed of integrated circuit, and setting the constant on circuit is hard to carry out, the present invention is effective. In addition, in the case of using the characteristic-value extracting unit configured to extract a characteristic value (V1) from an output voltage of the coil portion, and a level shift circuit configured to add a level shift voltage (Vsh) to the characteristic value, the purpose of the present invention can be achieved by adding a relative small level shift value to the characteristic value, and therefore it most suitable when the electric-current consumption is limited.

Thus, the displacement detector of the present invention having the above effects is expected to be used in various application fields such as a position sensor for detection of angle used in motorized bicycles or a position sensor for plants such as electric generating facilities as well as a gear position sensor or a throttle position sensor for automobiles.

The invention claimed is:

1. A displacement detector comprising:
   a constant-current supply unit configured to output a constant current including an alternating current;
   a coil portion, to which the constant current is supplied;
   a magnetic core supported to be movable relative to said coil portion in a movable range; and
   a signal processing circuit configured to determine a displacement of said core to said coil portion in accordance with a change in output voltage of said coil portion under a condition of supplying the constant current to said coil portion;
   wherein said signal processing circuit comprises:
   (a) a peak-hold circuit which defines a characteristic-value extracting unit configured to extract a characteristic value from the output voltage of said coil portion,
   (b) a level shift circuit configured to add a level shift voltage to the characteristic value,
   (c) an A/D conversion circuit disposed between said peak-hold circuit and said level shift circuit and configured to convert the characteristic value into a digital signal, and
   (d) a temperature compensation circuit configured to perform a temperature compensation to an output of said level shift circuit;
   wherein a fluctuation width of temperature coefficient of a total of the characteristic value and the level shift voltage in said movable range is smaller than the fluctuation width of temperature coefficient of the characteristic value in said movable range.

2. The displacement detector as set forth in claim 1, wherein
   said coil portion comprises a curved coil having a curvature,
   said core has a same curvature as said curved coil, and is rotatable about a rotation axis, and
   an insertion amount of said core into said curved coil is changed by rotating said core about the rotation axis.

3. The displacement detector as set forth in claim 1, wherein said coil portion has a curved coil having a curvature, and said curved coil is fixed to a housing having a unit configured to adjust a change in curvature of said curved coil.

4. The displacement detector as set forth in claim 1, wherein
   said core is provided by a plurality of curved cores having a same curvature, which are supported to be rotatable about a single rotation axis,
   said coil portion comprises a plurality of coils having a same curvature as said curved cores, which are spaced from each other in the axial direction of the rotation axis, and
   insertion amounts of said curved cores into said coils are changed by rotating said curved cores about the rotation axis.

5. The displacement detector as set forth in claim 1, wherein
   said coil portion is provided by a pair of inner and outer coils having different curvatures, which are disposed to be curved in substantially parallel with each other,
   said core comprises a first core curved at a same curvature as said inner coil and supported to be rotatable about a rotation axis, and a second core curved at a same curvature as said outer and supported to be rotatable about the rotation axis,
   an insertion amount of said first core into said inner coil is changed by rotating said first core about the rotation axis, and
   an insertion amount of said second core into said outer coil is changed by rotating said second core about the rotation axis.

6. The displacement detector as set forth in claim 1, wherein said signal processing circuit comprises a signal compensation circuit composed of the A/D conversion circuit configured to convert a peak value of the output voltage of said coil portion into a digital signal, and a compensation circuit configured for digital trimming said digital signal.

7. A displacement detector comprising:
   a constant-current supply unit configured to output a constant current including an alternating current;
   a coil portion, to which the constant current is supplied;
   a magnetic core supported to be movable relative to said coil portion in a movable range; and
   a signal processing circuit configured to determine a displacement of said core to said coil portion in accordance with a change in output voltage of said coil portion under a condition of supplying the constant current to said coil portion;

wherein said signal processing circuit comprises:

(a) a peak-hold circuit which defines a characteristic-value extracting unit configured to extract a characteristic value from the output voltage of said coil portion, (b) a level shift circuit configured to add a level shift voltage to the characteristic value, and (c) a temperature compensation circuit configured to perform a temperature compensation to an output of said level shift circuit;

wherein a fluctuation width of temperature coefficient of a total of the characteristic value and the level shift voltage in said movable range is smaller than the fluctuation width of temperature coefficient of the characteristic value in said movable range.

8. A displacement detector comprising:

a constant-current supply unit configured to output a constant current including an alternating current;

a coil portion, to which the constant current is supplied;

a magnetic core supported to be movable relative to said coil portion in a movable range; and a signal processing circuit configured to determine a displacement of said core to said coil portion in accordance with a change in output voltage of said coil portion under a condition of supplying the constant current to said coil portion;

wherein said signal processing circuit comprises:

(a) a peak-hold circuit which defines a characteristic-value extracting unit configured to extract a characteristic value from the output voltage of said coil portion, and (b) a temperature compensation circuit configured to perform a temperature compensation to an output of said peak-hold circuit;

wherein the signal processing circuit is configured to add a level shift voltage to the characteristic value, wherein said temperature compensation circuit is configured to perform said temperature compensation to the shifted characteristic value, and wherein a fluctuation width of temperature coefficient of a total of the characteristic value and the level shift voltage in said movable range is smaller than the fluctuation width of temperature coefficient of the characteristic value in said movable range.

9. The displacement detector as set forth in claim 8, further comprising a level shift circuit which is disposed between said coil portion and said peak-hold circuit and configured to add said level shift voltage to the characteristic value.

* * * * *